United States Patent
Wurcker

(10) Patent No.: US 10,439,796 B2
(45) Date of Patent: Oct. 8, 2019

(54) METHODS AND DEVICES AGAINST SIDE-CHANNEL ANALYSIS

(71) Applicant: ESHARD, Martillac (FR)

(72) Inventor: Antoine Wurcker, Villenave D'Ornon (FR)

(73) Assignee: ESHARD, Martillac (FR)

( * ) Notice: Subject to any disclaimer, the term of this patent is extended or adjusted under 35 U.S.C. 154(b) by 275 days.

(21) Appl. No.: 15/636,242

(22) Filed: Jun. 28, 2017

(65) Prior Publication Data

US 2017/0373831 A1    Dec. 28, 2017

(30) Foreign Application Priority Data

Jun. 28, 2016  (EP) ..................................... 16176716
Jun. 28, 2016  (EP) ..................................... 16176717

(Continued)

(51) Int. Cl.
*H04L 9/00*    (2006.01)
*H04L 9/06*    (2006.01)
(Continued)

(52) U.S. Cl.
CPC ................ *H04L 9/002* (2013.01); *G09C 1/00* (2013.01); *H04L 9/0631* (2013.01);
(Continued)

(58) Field of Classification Search
CPC ..... H04L 9/002; H04L 9/0631; H04L 9/0861; H04L 9/14; H04L 2209/12; H04L 2209/04; H04L 2209/08; G09C 1/00
See application file for complete search history.

(56) References Cited

U.S. PATENT DOCUMENTS 6,278,783 B1    8/2001  Kocher et al.
8,422,668 B1 *  4/2013  Thichina ................ H04L 9/003
                                                        380/28

(Continued)

FOREIGN PATENT DOCUMENTS

EP    1267514 A2    12/2002
EP    1601132 A1    11/2005
(Continued)

OTHER PUBLICATIONS

Golic, Jovan et al., "Multiplicative Masking and Power Analysis of AES", CHES 2002, LNCS 2523, pp. 198-212. (Year: 2003).*
(Continued)

*Primary Examiner* — Michael Pyzocha
(74) *Attorney, Agent, or Firm* — Brake Hughes Bellermann LLP

(57) ABSTRACT

A method for executing an operation whereby a first input data, may be combined with a second input data, may include: defining data pairs whereby each data of a first input set is associated with a respective data of a second input set, the data in the first and second input sets may be obtained by applying Exclusive OR (XOR) operations to the first and second input data and to all first and second mask parameters of first and second mask sets; and computing output data by applying the operation to each of the data pairs, to obtain an output set, the first and second mask sets being such that a combination by XOR operations of each pairs of corresponding first and second mask parameters may produce a third mask set, where each mask sets may include a word column having a same number of occurrences of all possible values of the words.

27 Claims, 12 Drawing Sheets

(30) Foreign Application Priority Data

| Jun. 28, 2016 | (EP) | 16176718 |
|---|---|---|
| Jun. 28, 2016 | (EP) | 16176719 |
| Jun. 28, 2016 | (EP) | 16176721 |

(51) Int. Cl.
*H04L 9/08* (2006.01)
*H04L 9/14* (2006.01)
*G09C 1/00* (2006.01)

(52) U.S. Cl.
CPC .............. *H04L 9/0861* (2013.01); *H04L 9/14* (2013.01); *H04L 2209/04* (2013.01); *H04L 2209/08* (2013.01); *H04L 2209/12* (2013.01)

(56) References Cited

U.S. PATENT DOCUMENTS

| 8,625,780 | B2 | 1/2014 | Peter et al. | |
| 2001/0053220 | A1 | 12/2001 | Kocher et al. | |
| 2005/0259814 | A1* | 11/2005 | Gebotys | H04L 9/003 380/28 |
| 2006/0056622 | A1 | 3/2006 | Liardet et al. | |
| 2007/0076890 | A1 | 4/2007 | Muresan et al. | |
| 2007/0160196 | A1 | 7/2007 | Timmermans | |
| 2007/0188355 | A1* | 8/2007 | Baek | H04L 9/003 341/51 |
| 2008/0019503 | A1 | 1/2008 | Dupaquis et al. | |
| 2008/0240443 | A1 | 10/2008 | Vuillaume et al. | |
| 2009/0074181 | A1 | 3/2009 | Pelletier | |
| 2011/0268266 | A1* | 11/2011 | Fujisaki | H04L 9/003 380/28 |
| 2012/0250854 | A1 | 10/2012 | Danger et al. | |
| 2013/0236005 | A1* | 9/2013 | Ikeda | H04L 9/003 380/28 |
| 2014/0281573 | A1* | 9/2014 | Jaffe | G06F 21/72 713/189 |
| 2014/0351603 | A1* | 11/2014 | Feix | H04L 9/003 713/189 |
| 2015/0169904 | A1 | 6/2015 | Leiserson et al. | |
| 2015/0172042 | A1* | 6/2015 | Karroumi | G06F 7/727 380/28 |
| 2015/0222423 | A1* | 8/2015 | Pepin | G06F 7/00 713/189 |
| 2015/0244524 | A1* | 8/2015 | Pulkus | H04L 9/003 380/28 |
| 2016/0127123 | A1* | 5/2016 | Johnson | H04L 9/003 713/189 |
| 2016/0269175 | A1 | 9/2016 | Cammarota et al. | |
| 2017/0063524 | A1* | 3/2017 | Bruneau | H04L 9/005 |
| 2017/0104586 | A1 | 4/2017 | Hars | |
| 2017/0244552 | A1 | 8/2017 | Thiebeauld De La Crouee et al. | |
| 2017/0373829 | A1 | 12/2017 | Wurcker et al. | |
| 2017/0373832 | A1 | 12/2017 | Wurcker et al. | |
| 2017/0373838 | A1 | 12/2017 | Wurcker et al. | |

FOREIGN PATENT DOCUMENTS

| GB | 2443355 A | 4/2008 |
|---|---|---|
| WO | 0108012 A1 | 2/2001 |

OTHER PUBLICATIONS

Extended European Search Report from EP Appn. No. 16176714.0, dated Jan. 3, 2017, 6 pages.
Extended European Search Report from EP Appn. No. 16176717.3, dated Jan. 3, 2017, 6 pages.
Extended European Search Report from EP Appn No. 16176721.5, dated Jan. 3, 2017, 7 pages.
Extended European Search Report from EP Appn. No. 16176716.5, dated Jan. 3, 2017, 7 pages.
Extended European Search Report from EP Appn No. 16176719.9, dated Jan. 5, 2017, 8 pages.
Extended European Search Report from EP Appn. No. 16176718.1, dated Dec. 22, 2016, 9 pages.
Bruneau, Nicolas, et al., "Multi-Variate Higher-Order Attacks of Shuffled Tables Recomputation", http:// eprint.iacr.org/2015/837.pdf, retrieved May 9, 2016, 20 pages.
Coron, Jean-Sebastien, "Higher Order Masking of Look-up Tables", International Association for Cryptologic Research, vol. 2014025:092212, Feb. 5, 2014, 22 pages.
Herbst, Christoph, et al., "An AES Smart Card Implementation Resistant to Power Analysis Attacks", Applied Cryptography and Network Security Lecture Notes in Computer Science; LNCS, Jan. 1, 2006, 14 pages.
Itoh, Kouichi, et al., "DPA Countermeansure Based on the "Masking Method"", ICICS 2001, LNCS 2288, 2002, pp. 440-456.

* cited by examiner

METHODS AND DEVICES AGAINST SIDE-CHANNEL ANALYSIS

CROSS REFERENCE TO RELATED APPLICATIONS

This application claims priority to European Application Numbers, EP16176716.5, EP16176717.3, EP16176718.1, EP16176719.9, EP16176721.5, each filed Jun. 28, 2016, the disclosures of which are incorporated herein by reference.

TECHNICAL FIELD

The present disclosure relates to methods and devices for protecting a circuit or a program against side channel analysis and providing a value of a secret data handled by the circuit or program, and in particular a circuit for transforming a message by an encryption or decryption algorithm using a secret key.

The present disclosure also relates to devices implementing a cryptographic algorithm, such as secure devices (smart card integrated circuits), hardware cryptographic components integrated onto mother boards of computers and other electronic and IT equipment (USB drives, TV decoders, game consoles, etc.), or the like.

The present disclosure also relates to circuits implementing a cryptographic algorithm, such as AES (Advanced Encryption Standard). The present disclosure also relates to a program implementing such an algorithm, provided for being executed in a secure or non-secured environment.

The present disclosure also relates to circuits and software implementing an operation combining two data which are required to be kept hidden.

BACKGROUND

Circuits implementing cryptographic algorithms can include a central processing unit (CPU), and a circuit dedicated to cryptographic computing, for example a cryptographic co-processor. These circuits may include thousands of logic gates that switch differently according to the operations executed. These switching operations create short variations in current consumption, for example of a few nanoseconds, and those variations can be measured. In particular, CMOS-type integrated circuits include logic gates that only consume current when they switch, i.e., when a logic node changes its state to 1 or to 0. Therefore, the current consumption depends on data handled by the central processing unit CPU and on its various peripherals: memory, data flowing on data or address bus, cryptographic co-processor, etc.

Furthermore, certain software programs using encryption or obfuscation techniques, such as the White-box Cryptography technique, may integrate secret data in such a way that it is very difficult to determine data by reverse engineering. Certain software programs may also receive a secret data from outside through a secure communication channel.

Such circuits may be subjected to so-called side channel analysis attacks based on observing current consumption, magnetic, or electromagnetic radiation. Such attacks provide secret data, in particular encryption keys. Current side channel attacks implement statistical analysis methods such as SPA ("Single Power Analysis"), DPA ("Differential Power Analysis"), CPA ("Correlation Power Analysis") or EMA ("ElectroMagnetic Analysis"). SPA analysis normally only requires the acquisition of a single current consumption trace. SPA analysis obtain information about the activity of the integrated circuit by observing the part of the current consumption trace corresponding to a cryptographic computation, since the current consumption trace varies according to the operations executed and the data handled. Software may also undergo such side channel attacks during its execution by a circuit.

DPA and CPA analyses enable the key of an encryption algorithm to be found by acquiring numerous circuit consumption traces and by statistically analyzing these traces to find a target information. DPA and CPA analyses can be based on the premise that the consumption of a CMOS-type integrated circuit varies when a bit changes from 0 to 1 in a register or on a bus, and does not vary when a bit remains equal to 0, remains equal to 1 or changes from 1 to 0 (discharge of a stray capacitance of a MOS transistor). Alternatively, the consumption of a CMOS-type integrated circuit varies when a bit changes from 0 to 1 or changes from 1 to 0 and does not vary when a bit remains equal to 0 or remains equal to 1. This second hypothesis enables the conventional "Hamming distance" or "Hamming weight" functions to be used in order to develop a consumption model that does not require knowledge of the structure of the integrated circuit in order to be applicable. DPA analysis involves amplifying this consumption difference using statistical processing on numerous current consumption traces, aiming to highlight a measurement difference between two types of current consumption traces distinguished according to formulated hypotheses.

CPA analysis is based on a linear current consumption model and involves computing a correlation coefficient between, firstly, the consumption points measured that form the captured consumption traces and, secondly, an estimated consumption value, computed from a linear consumption model and a hypothesis on data to be discovered that is handled by the microcircuit and on the value of the encryption key.

Electromagnetic analysis (EMA) is based on the principle that an integrated circuit may send information in the form of near or far field electromagnetic radiation. Given that transistors and the wires connecting the transistors emit electromagnetic signals when their state changes, these signals can be treated like the current consumption variation signals by an analysis such as one of the SPA, DPA and CPA analyses. Other side channel analyses exist, such as "Template analysis" and "Mutual Information Analysis" (MIA). All of the above-mentioned analyses are based on a time alignment of all the analyzed traces. In other words, all the measurements performed at a given time, e.g., from the time the execution of a command is activated by the circuit, must correspond to the same data handled by the algorithm.

SUMMARY

In one general aspect, a method for executing by a circuit an operation whereby a first input data, is combined with a second input data may include defining data pairs whereby each data of a first input set is associated with a respective data of a second input set, the first input set including the first input data, the data in the first input set being obtained by applying Exclusive OR (XOR) operations to the first input data and to all first mask parameters in a first mask set, each first mask parameter in the first mask set including at least one first word, the first words in the first mask set having a same size and forming a first word subset including a single word from each first mask parameter of the first mask set and a same number of occurrences of all possible values of the first words, the second input set including the second input data, each data in the second input set being obtained applying XOR operations to the second input data and to all second mask parameters in a second mask set, each second mask parameter in the second mask set including at least one second word, the second words in the second mask set having a same size and forming a second word subset including a single word from each second mask parameter of the second mask set and a same number of occurrences of all possible values of the second words, and computing output data by applying the operation to each of the data pairs, an output set of the operation including all output data resulting from the application of the operation to one of the data pairs. The second mask set may be generated so that a combination by XOR operations of each of the first mask parameters in the first mask set with a corresponding second mask parameter in the second mask set produces a third mask set including third mask parameters, each third mask parameter in the third mask set including at least one third word, the third words in the third mask set having a same size and forming a third word subset including a single word from each third mask parameter of the third mask set and a same number of occurrences of all possible values of the third words.

Implementations can include one or more of the following features. For example, the operation may be an Exclusive OR. The second input set may be equal to the first mask set. The first and second mask sets may be generated from a first pair of first and second permutations of words, each including a same number of occurrences of all possible values of the words, such that the combination by XOR operations of each word in the first permutation with a respective word of the second permutation provide a resultant permutation including words, and the same number of occurrences of all possible values of the words, the first and second mask sets being generated using the following equations:

$$U1[l]=PM(u1[l] \oplus UR), \text{ and}$$

$$V1[l]=PM(v1[l] \oplus VR), \text{ or}$$

$$U1[l]=PM(u1[l]) \oplus UR, \text{ and}$$

$$V1[l]=PM(v1[l]) \oplus VR,$$

for each index l, where UR and VR are random words of the size of any of the masks parameters U1[l] or V1[l], u1 and v1 are previously computed sets obtained by the equations, or equal to the mask sets of the first pair respectively, and PM is a randomly selected permutation applied to the sets u1 and v1.

In some implementations, each second input data in the second input set is selected in a respective masked substitution table by a substitution operation, the masked substitution tables being generated from an input substitution table and including one masked substitution table for each of the first mask parameters in the first mask set and the corresponding second mask parameter in the second mask set.

In some implementations, the masked substitution tables are generated by: generating the first mask set; generating the second mask set including a number of second mask parameters equal to the number of values in the input substitution table; selecting once each mask parameter in the first and second mask sets to form mask pairs, each including one of the first mask parameters and one of the second mask parameters; generating for each mask parameter in the first mask set one of the masked substitution table, the generation of each of the masked substitution tables including: selecting each data in the input substitution table, and for each selected data: computing a masked data by applying XOR operations to the selected data and to the second mask parameter corresponding to the first mask parameter or to a transformed value thereof; computing a masked index by applying XOR operations to to an original index and to the first mask parameter or a transformed value thereof; and storing the masked data in the masked substitution table, the selected data being selected at the original index and the masked data being stored at the masked index, or the selected data being selected at the masked index and the masked data being stored at the original index.

In some implementations, the computations of the data in the output set are performed in a random order.

In some implementations, each output data in the output set includes at least one word, the words in the output set having a same size and forming a an output word subset including a single word from each output data in the output set and a same number of occurrences of all possible values of the words, the method including: detecting in the output word subset a word having a number of occurrences different from the number of occurrences of other words in the output word subset, an error being detected when two words with different numbers of occurrences are found the word output subset, or combining by XOR operations each data in the output set with a respective mask parameter of a resultant mask set such the output set includes data resulting from applying XOR operations to an output data of the operation applied to the first and second input data and to each mask parameter of the resultant mask set, an error being detected when XOR operations applied to two data in the output set provide different data.

In some implementations, the first input data is generated by operations including a bit permutation operation by which bits of an input data are mixed, the method including applying the bit permutation operation to all data in a third input set in which each data in combined by XOR operations to one the first mask parameters in the first mask set, an output of the bit permutation operation including an output set including all data resulting from the application of the bit permutation operation to one of the data in the third input set, the first mask set being generated so that: each data in the output set of the bit permutation operation includes at least two words, the words in the output set having a same size and forming an output word subset including a single word from each data in the output set and a same number of occurrences of all possible values of the words in the output word subset.

In another general aspect, a method may include a cryptographic algorithm conforming with Advanced Encryption Standard (AES) algorithm, may include: generating an input set by applying XOR operations to each word of the input data, to each mask parameter of the first mask set, and to a word of a secret key corresponding the word of the input data; performing several intermediate rounds, each including: performing a substitution operation using masked substitution tables providing a substitution output set in which each word is masked by a respective mask parameter of the second mask set, computing a masked round output set by applying XOR operations to each word of a round set masked by a respective mask parameter of the second mask set, to a respective mask parameter of the first mask set and to a respective mask parameter of the second mask set, and using the masked round output set as an input set for a next round, and providing an output set in which each word is masked by a respective mask parameter of the first mask set.

In another general aspect, a method including a cryptographic algorithm conforming with Advanced Encryption Standard (DES) algorithm, may include: generating an input set by applying XOR operations to each word of a result data provided by an initial bit permutation operation, and to each mask parameter of the first mask set; performing several intermediate rounds, each including: performing an expansive bit permutation applied at a first round to the input set and at subsequent rounds to a round output set, the first mask set being generated so that each data in a bit permutation output set of the bit permutation operation includes at least two words, the words in the output set having a same size and forming an output word subset including a single word from each data in the output set and a same number of occurrences of all possible values of the words in the output word subset; performing a substitution operation using masked substitution tables providing a substitution output set in which each word is masked by a respective mask parameter of the second mask set, computing a masked round output set by applying XOR operations to each word of a round set masked by respective mask parameters of the first and second mask sets, and to a respective mask parameter of the second mask set, and providing an output set in which each word is masked by a respective mask parameter of the first mask set.

BRIEF DESCRIPTION OF THE DRAWINGS

The method and/or device may be better understood with reference to the following drawings and description. Non-limiting and non-exhaustive descriptions are described with the following drawings. In the figures, like referenced signs may refer to like parts throughout the different figures unless otherwise specified.

DETAILED DESCRIPTION

In view of the drawbacks and considerations noted above, it may be desirable to propose a protection for an integrated circuit or a software program against one or more of these side channel analyses.

For instance, such circuits against side channel analysis may be described in French Patent application no. FR16 51443 filed on Feb. 22, 2016 by Applicant, which discloses a method for analysing traces representative of the activity of a circuit when the latter executes an operation successively on different input data. This method may include extracting a part of each trace, and generating a histogram from each extracted trace part, by counting an occurrence number of each possible value appearing in each of the extracted parts of these traces. Partial results of the operation may then be computed by applying the operation to each input data and each possible value of a part of a secret key involved in the operation. The method may then identify for each possible part value of the secret key, all the input data which provide the same partial result. For each possible part value of the secret key, the occurrence numbers in the histograms, corresponding to the identified input data and the part value of the secret key may then be added. The part of the secret key can be determined by subjecting the added occurrence numbers to a statistical analysis. The statistical analysis may assume that if a value related to the secret key has leaked in the extracted parts of the traces, it can be highlighted by the added occurrence numbers.

Example embodiments may relate to a method for encrypting or decrypting an input data according to a cryptographic algorithm including an operation combining a first and a second input data, wherein the operation is performed according to the above-defined method.

Example embodiments may also relate to a circuit including a processor and configured to implement the methods as above defined. The circuit may include a co-processor.

Example embodiments may also relate to a device including a circuit as above-defined, arranged on a medium, such as, for example, a plastic card.

Example embodiments may also relate to a computer program product loadable into a computer memory and including code portions which when executed by a computer configure the computer to carry out the steps of the methods as above-defined.

Figure 1:
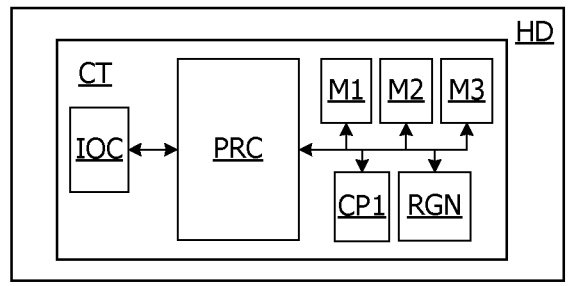
FIG. 1 illustrates a conventional architecture of a secure circuit.

FIG. 1 illustrates a secure integrated circuit CT, for example arranged on a portable medium HD, such as a plastic card or any other medium, or in a terminal, such as a mobile terminal. The integrated circuit CT may include a microprocessor PRC, an input/output circuit 100, memories M1, M2, M3 coupled to the microprocessor by a data and address bus and, optionally, a cryptographic computation coprocessor CP1 or arithmetic accelerator, and/or a random number generator RGN. The memories M1, M2, M3 can include a volatile memory M1, for example a RAM-type ("Random Access Memory") memory containing volatile application data, a non-volatile memory M2, for example an EEPROM or Flash memory, containing non-volatile data and application programs, and possibly a read-only memory M3 (or ROM memory) containing the operating system of the microprocessor. The operating system can also be stored in the non-volatile memory.

The communication interface circuit IOC may be of contact type, for example according to the ISO/IEC 7816 standard, of contactless type with inductive coupling, for example according to the ISO/IEC 14443A/B or ISO/IEC 13693 standard, of contactless type by electrical coupling (UHF interface circuit), or of both contact and contactless type. The interface circuit IOC may also be coupled through a specific interface, to another circuit such as an NFC (Near-Field Communications) controller, or a main circuit of a terminal such as a mobile terminal or a connected object.

In some implementations, the integrated circuit CT may be configured to execute operations of encrypting, decrypting and/or signing messages that are sent to the integrated circuit CT using a cryptographic function. This cryptographic function may be executed by the microprocessor PRC of the circuit CT or partially or totally executed by the microprocessor PRC or the coprocessor CP1.

As described herein, "word" designates a group of bits in a data, and "word column" designates a subset in a data set including a single word from all data in the data set, all the words in the word column having the same size. The words forming a word column are not necessary aligned, i.e., do not necessary includes the same bit positions in the data of the data set. Example embodiments as described herein propose protection methods for an operation, e.g. an operation in a cryptographic algorithm, against side channel analysis. Accordingly, the operation may receive an input data, and may provide an output data as a function of the value of the input data. In an example embodiment, a protection method may include executing the operation to be protected for all data of an input set including the input data required to be processed by the operation. Each data in the input set may include at least one word, and the words in the input set may have the same size and may form a word subset or column including a single word from each data in the input set and a same number of occurrences of all the possible words in relation to the size of the words.

In another example embodiment, a protection method may include providing as result of the operation an output set including the expected output data. Each data may include at least one word, and the words in the output set may have the same size and may form a word subset or column including a single word from each data in the output set and the same number of occurrences of all the possible words in relation to the size of the words.

Figure 2:
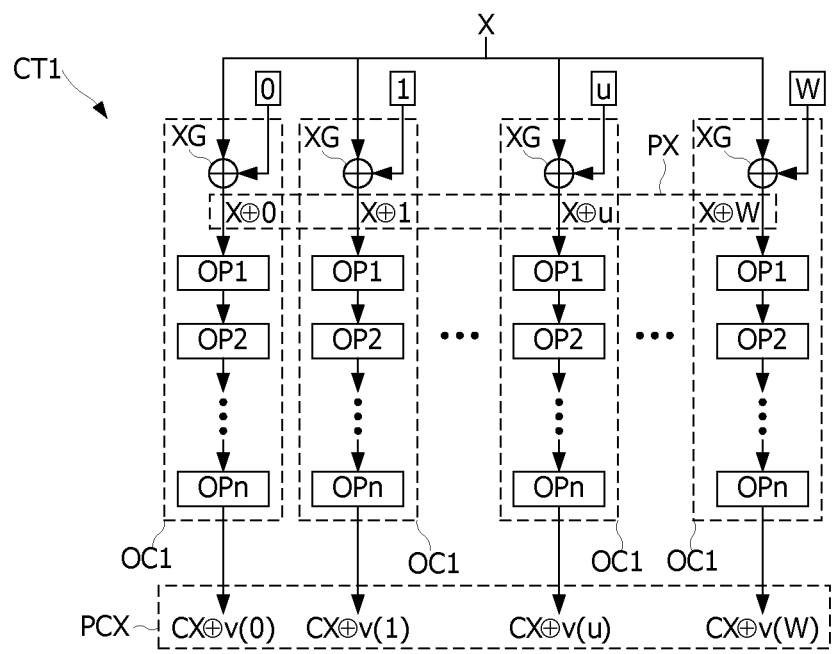
FIG. 2 is a block diagram of a circuit protected according to an example embodiment.

FIG. 2 illustrates a circuit CT1 receiving an input data X to be processed and serially performing several operations OP1, OP2, ... OPn applied to the input data X, in accordance to an example embodiment. The circuit CT1 may include several circuits OC1, each serially performing the operations OP1, OP2, ... OPn. Each circuit OC1 may receive the input data X and a respective input mask parameter u of an input mask parameter set. Accordingly, the circuit CT1 may include W+1 circuits OC1 respectively receiving masks equal to 0, 1 ... W, W representing the greatest possible value of the mask parameter u when considering the size in bits of the mask parameter. Each circuit OC1 may include a circuit XG applying Exclusive OR operations (XOR) to the input data X and to the mask parameter u (=0 or 1, ... or W). In each circuit OC1, the data $X \oplus u$ (u=0, ... W) provided by the circuit XG may be applied to an input of the operation OP1.

The operations OP1-OPn are such that:

$$OPn( \ldots OP2(OP1(X \oplus u)) \ldots ) = CX \oplus v(u), \quad (1)$$

where "$\oplus$" represents the XOR operator, v(u) represents an output mask parameter depending on the input mask parameter u and CX is the result of the operations OP1-OPn applied to the input data X:

$$CX = OPn( \ldots OP2(OP1(X)) \ldots ). \quad (2)$$

Thus, each circuit OC1 provides an output data equal to $CX \oplus v(u)$ (u=0, 1, ..., or W).

The circuit CT1 may provide an output set PCX including the output data $CX \oplus v(0)$, $CX \oplus v(1)$, ... $CX \oplus v(u)$, ... $CX \oplus v(W)$. The operations OP1-OPn can be adapted such that the output data corresponding to the input data $X \oplus u$ provided by the operations OP1-OPn is equal to $CX \oplus v(u)$ for each value of the mask parameter u (0-W) and the set of output mask parameters v(u) with u=0 to W, includes a same number of occurrences of all possible values when considering the size of the output masks parameters v(u). Each output mask parameter v(u) can be equal to the corresponding input mask parameter u. In some implementations, the computations of the output data in the output set PCX may be performed in a random order, and/or stored in a random order. Hence, the different values of the mask parameter u may be respectively applied to the circuits OC1 in a random order. Accordingly, the circuit OC1 of rank k in the circuit CT1 may receive an input mask parameter u=U[k], U being a mask set generated by random permutation of all possible numbers between 0 and W. In the same way, the circuit OC1 of rank 0 in the circuit CT1 may receive a mask parameter U[0], and the circuit OC1 of rank W in the circuit CT1 may receive an input mask parameter U[W].

In some implementations, the circuits OC1 may be independent from each other and the computation of each of the data $CX \oplus v(u)$ of the output set PCX may be independent from the computations of the other data of the output set. Therefore the operations OP1-OPn in all the circuits OC1 can be performed in any order, provided that the order of the operations within each circuit OC1 is respected.

Unlike conventional protections involving hiding the operation to be protected in a flood of identical operations applied to random data and, thus, uncorrelated from the required input data of the operation to be protected, exemplary methods illustrated herein are to execute the operation on other data not chosen randomly. Indeed, such other data are correlated to the required input data insofar as the input set formed of such other data and of the required data to be processed, includes all possible data having the size of the data susceptible of being processed by the operation, with a same number of occurrences. Moreover, the input data to be processed by the operation should have an unpredictable position in the input set, but known by the circuit performing the operation.

The input set may be obtained by combining the required input data X by a logical XOR operations with a mask parameter U[l] of a mask set U including for example all possible values of one byte (between 0 and 255). Thus, if the input data X has the size of one byte, the input set includes 256 data equal to X⊕U[l] where U[l]=0 to 255, and the required input data X=PX[n]=X⊕U[n], with U[n]=0 ("⊕" representing the XOR operator applied to bytes). When the input data is encoded on one byte, an operation can be protected according to an example embodiment by applying the operation to all the data in the input set including the data PX[l]=X⊕U[l], with l=0 to 255, i.e., all possible data having the size of one byte. The computations of the output data in the output set may be performed in a random order. To this purpose, the data in the input set can be arranged in a random order.

Figure 3:
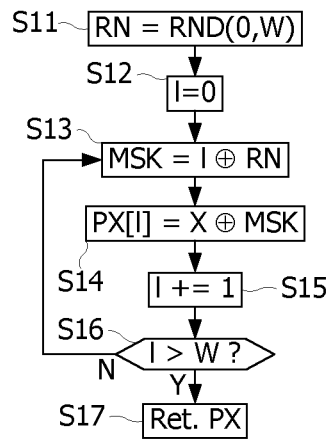
FIG. 3 is a flow-chart of protection steps transforming an input data according to an example embodiment.

FIG. 3 illustrates steps (operations, functions, processes, etc.) S11 to S17 of a procedure for generating an input set PX including an input data X, according to an example embodiment. Steps S11 to S16 may be executed successively. In step S11, a variable RN may receive a random value between 0 and a maximum value W determined according to the size defined by the number of bits used to encode the input data X in binary code. Thus, for a variable RN encoded on b bits, the maximum value W equals 2b−1. If the variable RN is encoded on 8 bits, the value W equals 255. If the variable RN is encoded on 16 bits, the value W equals 216−1 (=65535). In step S12, an index l may be set to 0. In step S13, a mask parameter MSK (=I⊕RN) may be computed by applying XOR operations to the index l and to the variable RN. In step S14, an input data PX[l] designated by the index l in a table forming the input set PX may be computed by applying XOR operations to the input data X, and to the mask parameter MSK.

Figure 4:
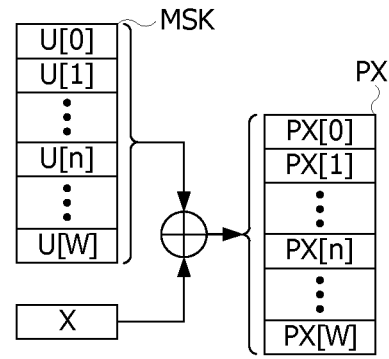
FIG. 4 is a block diagram illustrating protection steps, according to an example embodiment.

FIG. 4 represents the input data X, the different values U[0] (=0⊕RN), U[1] (=1⊕RN), . . . U[W] (=W⊕RN) of the mask parameter MSK and the different data PX[0], PX[1]), . . . PX[W] of the input set PX.

At step S15, the index l may be incremented by operation one (1) as mentioned above. At step S16, the index l may be compared with the maximum value W, and if it is greater than the value W, step S17 may be executed; otherwise a new iteration of the calculation may be executed in steps S13 to S16. At step S17, the table PX may be provided as an output of the procedure S11-S17, the expected input data being in the table PX at an index n (X=PX[n]), this index n having a value such that the mask parameter U[n]=0. Indeed, the result of XOR operations applied to data D and 0 does not transform the data D.

In some implementations, values of the mask parameter MSK can be processed in a random order and not necessarily in the order from 0⊕RN to W⊕RN. Several operations can be applied to the input set PX to compute an output set. The expected output data can be extracted at a known index n from an output set at a subsequent step in the processing, for example considered less sensitive to side channel analysis.

Further, the input data X can be encoded on several binary words having a same number of bits. The mask parameter MSK may also have the same number of bits as the data X. If the input data is encoded on one byte (8-bit words), the mask parameter MSK can be also encoded on 8 bits. The number of iterations W+1 that must be executed between steps S13 to S16 is equal to 2b, b being the size in number of bits of the data X. If the data X is encoded on one word of 16, 32 or 64 bits, it may be desirable to limit this number of iterations. If the operations applied to the input data are performed byte per byte, the mask parameter mask parameter MSK may be encoded on 8 bits, and the mask parameter MSK can be combined with the input data X at step S14 by concatenating the mask parameter MSK with itself several times to form a word of the size of the input data X. Therefore, in the event that the data X is encoded on 16 bits, the mask parameter MSK encoded on 8 bits can be concatenated with itself to obtain a word on 16 bits. The operation executed in step S14 then becomes:

$$PX[l]=X \oplus MSK//MSK, \quad (3)$$

"//" representing the concatenation operator of binary words. In the event that the data X is encoded on 32 bits, each value of the mask parameter MSK encoded on 8 bits is concatenated with itself three times to obtain a word on 32 bits. The operation executed in step S14 then becomes:

$$PX[l]=X \oplus MSK//MSK//MSK//MSK. \quad (4)$$

In fact, the mask parameter MSK used as a mask can have the size of the words processed by the considered operation in the algorithm.

In addition, the concatenated values of the mask parameter MSK can be different from each other:

$$PR[i]=OPR(X,KY \oplus MSK1//MSK2//MSK3//MSK4). \quad (5)$$

provided that the indexes where MSKj=0 (j=1, 2, 3, 4) are stored.

Figure 5:
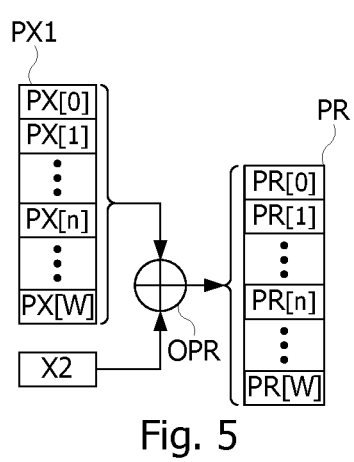
FIG. 5 is a block diagram illustrating an operation performed by the circuit of FIG. 2 in accordance to an example embodiment.

FIG. 5 illustrates an application of an operation such as XOR to a protected data X1 and a non-protected data X2, the data X1, X2 having the size of one or several words. Accordingly, the data X1 is represented by an input set PX1 including data PX[0], PX[1], . . . PX[W], each of these data having the same size as the input data X1, with W=2b−1 where b is the size of the words within the input data. The required data X1 may be at index n in the input set PX1: X1=PX[n], n being an integer number between 0 and W. The result of the operation may be an output set PR including W+1 output data PR[0], PR[1], . . . PR[W], wherein each data PR[j] (j=0, . . . W), equals PX[j]⊕X2. The expected result of the operation PR[n] (=PR[n]⊕X2=X1⊕X2) may be at the same index n in the table PR as the required input data X1 in the table PX1. As including W+1 data between 0 and W (as the input set PX1), the resulting output set PR may provide the same level of protection of the expected result PR[n] as the input set PX1.

Problems may arise when two protected data X1, X2 used in a cryptographic algorithm are combined by an operation such as XOR. For example, the data X1, X2 may be protected by being replaced by input sets of data PX1, PX2. Each of the input sets PX1, PX2 can also include all possible data depending on the size of the input data X1, X2, or a word thereof, defined by applying a set of mask parameters in the form of U[l]// . . . //U[l], with l=0, . . . W, U[l] having the size of a word, the input data being processed word by word.

Figure 6:
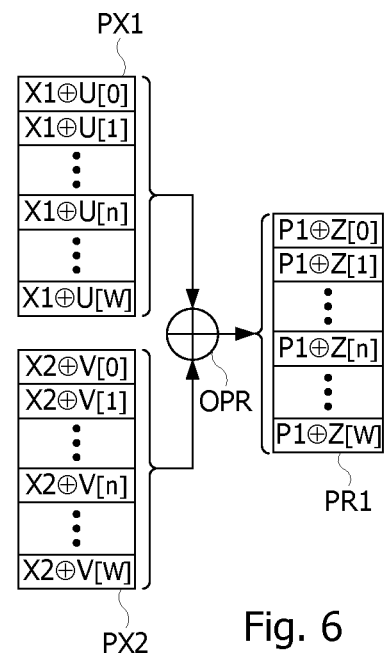
FIG. 6 is a block diagram illustrating an operation performed by the circuit of FIG. 2 in accordance to another example embodiment.

FIG. 6 illustrates the sets of input data PX1, PX2, in accordance to an example embodiment. The input set PX1 may include the data PX1[0], . . . PX1[W]. The required input data X1 (=PX1[$n$]) may be at the index n. Similarly, the input set PX2 may include the data PX2[0], . . . PX2[W], and the required input data X2 (=PX2[$n$]) may be at the same index n.

The input sets PX1 and PX2 may be generated by applying different mask values to the required input data X1 and X2:

$$PX1[j]=X1 \oplus Uj, \text{ for all values of the index } j \text{ in } \{0, \ldots, W\}, \text{ and}$$

$$PX2[j]=X2 \oplus Vj, \text{ for all values of the index } j \text{ in } \{0, \ldots, W\}.$$

Thus, a first way to protect the operation (X1⊕X2) could be by computing (PX1[$j$]⊕PX2[$j$]) for all values of the index j between 0 and W:

$$(X1 \oplus Uj) \oplus (X2 \oplus Vj) = (X1 \oplus X2) \oplus (Uj \oplus Vj). \quad (6)$$

In fact, it cannot be ensured that the data Uj⊕Vj are different from one another for each value of the index j. It may occur that Uj=Vk and Uk=Vj for particular values of indexes j and k, leading to a set of masking values Uj⊕Vj including two identical values Uj⊕Vk=Uk⊕Vj.

Accordingly, the output set PR does not satisfy the condition of including all possible data values (between 0 and W when X1 and X2 are encoded on one byte). In an extreme case, Uj and Vj may have the same value for each index value j. Therefore:

$$(X1 \oplus Uj) \oplus (X2 \oplus Vj) = (X1 \oplus X2) \oplus 0 = X1 \oplus X2. \quad (7)$$

As a result, each of the W+1 computations may return the same result X1⊕X2 which may be the expected output result. Not only is the expected result not protected, but also this solution may generate a heavy leakage on the expected result since the operation to be protected is performed W+1 times.

In some implementations, generating protected output data may be selecting one data in one of the input sets PX1, PX2 and applying the operation to this selected data and to all the data of the other set of input data. Thus, for example, the data PX2[$k$] may be selected in the set PX2 and combined with all the data in the input set PX1. Therefore, each resulting data PR2[$j$] in the output set PR2 is computed as follows:

$$PR2[j]=PX1[j] \oplus PR2[k], \quad (8)$$

with j=0, 2, . . . W, and k having a fixed value. By doing this, it is ensured that the output set PR2 does not include two identical data PR2[$j$]:

$$PX1[j] \oplus PX2[k] = (X1 \oplus Uj) \oplus (X2 \oplus Vk) = (X1 \oplus X2) \oplus Uj \oplus Vk. \quad (9)$$

in which Uj⊕Vk is different from Uj'⊕Vk if Uj is different from Uj'. However, the computation of the result data PR2[$j$] in the output data PR2 may require reading a single data PX2[$k$] in the data set PX2, whereas all the data in the input set PX1 may be read. In some implementations, such an unbalanced processing could generate leakages enabling the disclosure of the data PX2[$k$]. If the chosen data PX2[$k$] is equal to the required input data X2 (=PX2[$n$]), then the leakage may enable the disclosure of the value of the data X2. If another data PX2[$k$] (k≠n) in the set PX2 is chosen to be combined with all the data PX1[$j$] of the set PX1, it may be required to store the value of the mask Mk such that the chosen data PX2[$k$]=X2⊕Uk.

Figure 7:
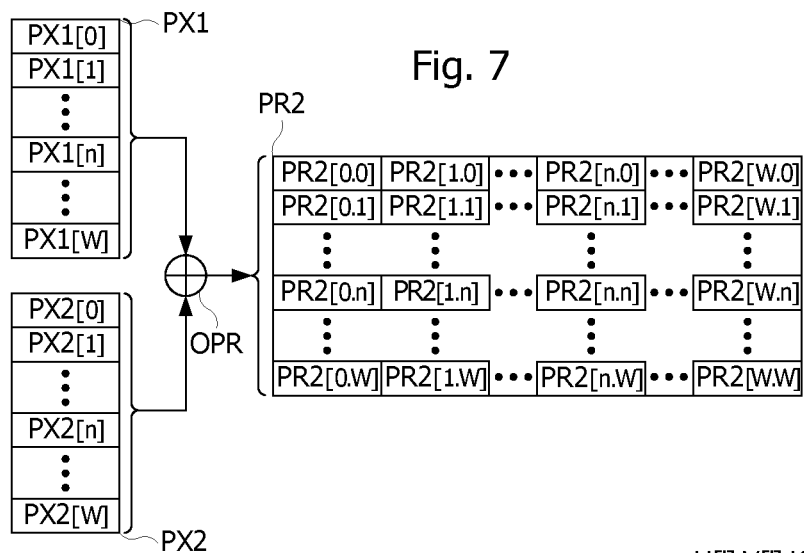
FIG. 7 is a block diagram illustrating an operation performed by the circuit of FIG. 2 in accordance to another example embodiment.

In some implementations, generating a protected output data may be illustrated in FIG. 7. In FIG. 7, an output set PR2 of the operation X1⊕X2 includes (W+1)(W+1) output data PR2[$i,j$], such that:

$$PR2[i,j]=PX1[i] \oplus PX2[j], \quad (10)$$

where the indexes i and j may have each all possible integer values between 0 and W. However, this solution may require to perform (W+1)(W+1) computations.

In other implementations, as illustrated in FIG. 6, each data PX1[$l$] in the input set PX1 and each data PX2[$l$] in the input PX2 are computed as follows:

$$PX1[l]=X1 \oplus U[l] \text{ and } PX2[l]=X2 \oplus V[l] \quad (11)$$

U and V being mask tables may include mask parameters U[l] and V[l], l=0, . . . W, such that each column of words in each table U and V may include the same number of occurrences of all possible values of a word of the column. In addition, the tables U and V are such that the combination U[l]⊕V[l] for all the values of the index l from 0 to W, may provide a mask set Z including at least one word column. Each word column of the mask set Z may include the same number of occurrences of all possible values of a word of the column.

In some implementations, one or several pairs (U0, V0) of mask tables U0 and V0 may be stored in the circuit CT1. Each pair (U0, V0) may be tested as providing a table Z such as each value Z[l]=U0[l]⊕V0[l]), each word column of the mask set Z may include the same number of occurrences of all possible values of a word having the size of the considered words. The circuit CT1 is configured to derive pairs of mask tables (u2, v2) as follows:

$$u2[l]=PM(u1[l] \oplus UR), \text{ and}$$

$$v2[l]=PM(v1[l] \oplus VR), \quad (12)$$

or $$u2[l]=PM(u1[l]) \oplus UR, \text{ and}$$

$$v2[l]=PM(v1[l]) \oplus VR, \quad (13)$$

for each index l, where UR and VR may be random words of the size of any of the masks parameters U[l] or V[l], u1 and v1 may previously be computed tables obtained by the equations (12) or (13), or equal to U0 and V0 respectively, and PM may be a randomly selected permutation applied to the elements of the tables U1 and V1. It can be proved that each pair (u2, v2) computed using the equation (12) or (13) may have a property of providing a table Z such that each word column of the mask table Z may include the same number of occurrences of all possible values of a word having the size of the considered words. Therefore, by an appropriate choice of the mask sets U and V, respectively, used for generating the input sets PX1, PX2 from the input data X1, X2, the computation method illustrated in FIG. 6 can provide a resultant output set PR1 protecting the output data X1⊕X2 with a same level of protection as the input sets PX1, PX2 for the input data X1, X2.

All the operations performed in AES (Advanced Encryption Standard) algorithm either implemented by software or in hardware can be protected using the exemplary methods as discussed herein.

Figure 8:
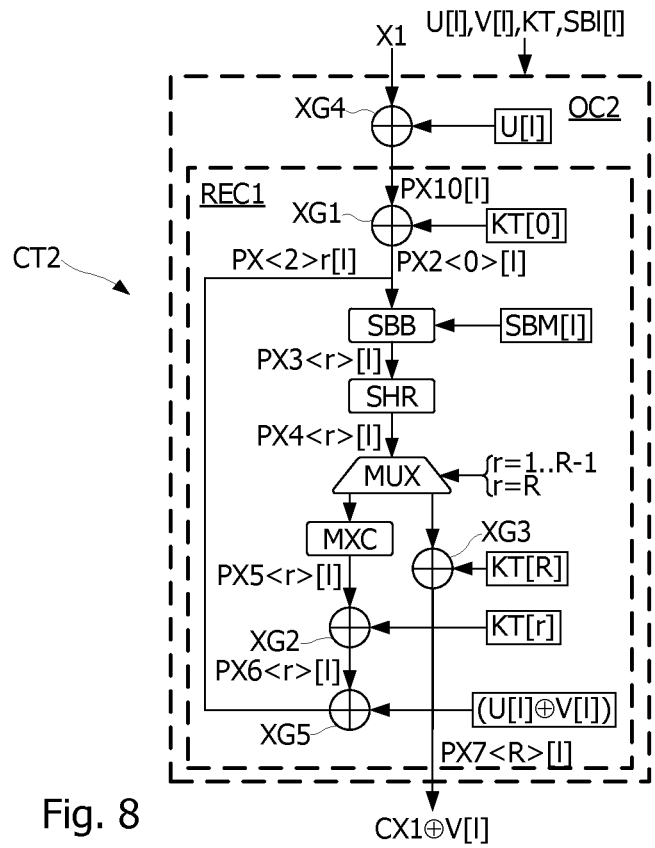
FIG. 8 is a block diagram of AES encryption algorithm including protection steps according to an example embodiment.

FIG. 8 illustrates a cryptographic calculation circuit CT2 implementing AES algorithm for encrypting a data, in accordance to an example embodiment. For further details about AES algorithm, the document "Advanced Encryption Standard FIPS PUB 197" published on 26 Nov. 2001 can be referred to. In FIG. 8, the cryptographic calculation circuit CT1 may receive a data X1 to be encrypted and a round key table KT including all necessary round keys derived from a secret key. The circuit CT1 may supply an encrypted data CX1. The circuit CT1 may include circuits XG1, XG2, XG3 performing XOR operations, a substitute calculation circuit SBB, a row-based circular permutation calculation circuit SHR, a column-based permutation calculation circuit MXC, and/or a multiplexer MUX. The circuits SBB, SHR, and MXC may be compliant with AES algorithm. The circuit XG1 may receive the data X1 to be encrypted and a first round key KT[0]. The output of the circuit XG1 may be supplied to the circuit SBB. One output of the circuit SBB may be supplied to the circuit SHR. One output of the circuit SHR may be supplied via the multiplexer MUX either to the circuit MXC or to an input of the circuit XG3 receiving at a key input a last round key KT[R]. One output of the circuit MXC may be connected to an input of the circuit XG2 receiving at a key input a round key KT[r] for the round r. One output of the circuit XG2 may be connected to the input of the circuit SBB. At a last round R, when a certain number of calculation rounds have been performed (10, 12 or 14, in accordance with AES) by the chain including the circuits SBB, SHR, MXC, and XG2, the multiplexer MUX may be actuated to provide the output of the circuit SHR to the circuit XG3 which supplies the output data CX1.

During a first calculation round, the data X1 may be processed by the circuit XG1 which adds (XOR) to it the first round key KT[0]. The circuit XG1 may provide the resulting data $X1 \oplus KT[0]$ which may be processed successively by the circuits SBB, SHR, MXC and XG2. Then the circuit XG2 may combine the data provided by the circuit MXC with the next round key KT[r]. The circuits SBB, SHR MXC and XG1 may be successively activated for several rounds R of AES algorithm. The substitute calculation circuit SBB may be generally implemented using a substitution table.

In some implementations, the circuit CT2 may have the architecture of the circuit CT1 (FIG. 2). Thus, the circuit CT2 may include W+1 circuits OC2, i.e., one circuit OC2 for each data in an input data set processed by the circuit CT2. Each circuit OC2 may include the circuits XG1, XG2, XG3, SBB, SHR, MXC and MUX. Each circuit OC2 may further include circuits XG4 and XG5. The circuit XG4 may receive the input data X1 and may be connected to the input of the circuit XG1. The circuit XG5 may be connected to the output of the circuit XG2 and to the input of the circuit SBB. Each circuit OC2 may receive respective mask parameters U[l], V[l] from mask tables U and V, and a respective masked substitution table SBM[l].

In some implementations, a masked substitution table SBM[l] is computed for each circuit OC2, using the following equation:

$$SBM[l, i \oplus U[l]] = SBX[i] \oplus V[l], \quad (14)$$

where SBX is the substitution or lookup table, i is an index for selecting a value SBX[i] in the table SBX and U[l] and V[l] are input and output masks respectively.

Figures 10A, 10B:
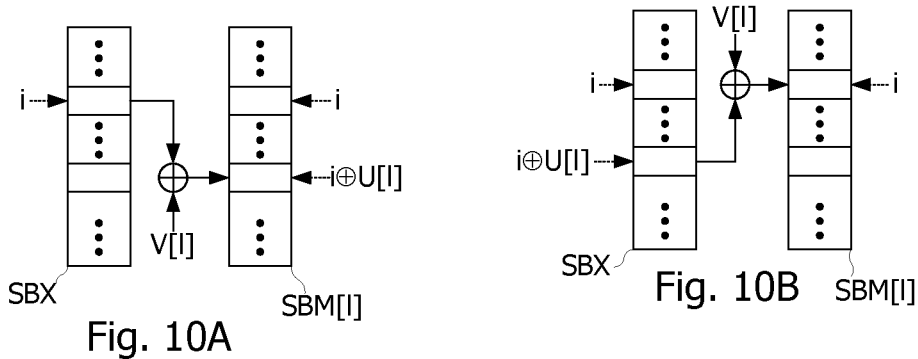
FIG. 10A is a block diagram of substitution tables, illustrating a method for protecting a substitution table, according to an example embodiment.
FIG. 10B is a block diagram of substitution tables, illustrating a method for protecting a substitution table, according to another example embodiment.

FIG. 10A illustrates the substitution table SBX and the masked table SBM[l] derived from the table SBX by applying equation (14) to each value SBX[i] in the table SBX. Accordingly, the result of the substitution operation applied to a masked input data $D \oplus U[l]$ may be an output data masked by the known output mask V[l]. As illustrated in FIG. 10B, the masked substitution table SBM[l] can also be obtained by applying the following equation:

$$SBM[l, i] = SBX[i \oplus U[l]] \oplus V[l], \quad (15)$$

to each value SB[i] of the substitution table SB.

Figure 9:
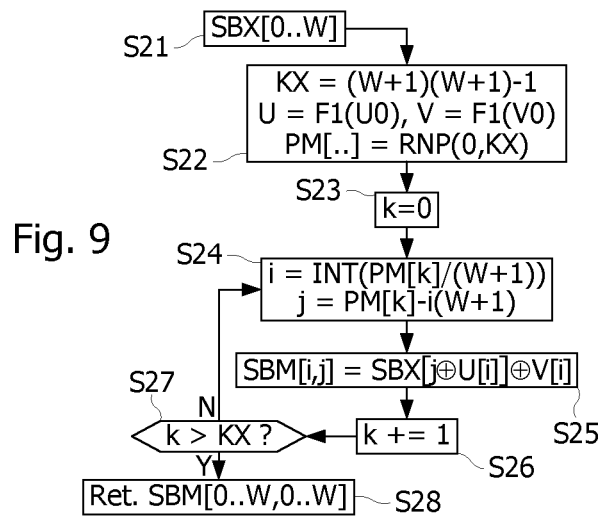
FIG. 9 is a flowchart of an operation protected according to an example embodiment.
Figure 10C:
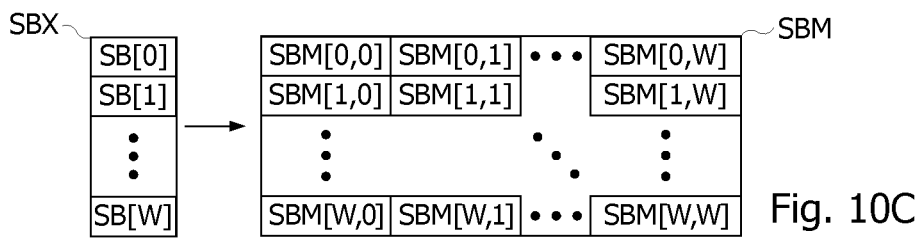
FIG. 10C is a block diagram of substitution tables, illustrating a method for protecting a substitution table, according to another example embodiment.

FIG. 9 illustrates steps (operations, functions, processes, etc.) S21 to S28 of a procedure for computing the masked substitution tables SBM from the AES substitution table SBX, according to an example embodiment. Steps S21 to S27 may first be successively performed. At step S21, the substitution table SBX may be input. At step S22, the mask tables U and V may be generated. In some implementations, the mask tables U and V may be generated using the equation (12) or (13). Each of the permutations U and V may include W+1 values between 0 and W, where W+1 is the number of values in the table SBX. One permutation PM in the form of a table may be randomly generated using a random permutation generation function RNP. The permutation PM may include (W+1)(W+1) values between 0 and a maximum value KX equal to (W+1)(W+1)−1. At step S23, an index k is initialized to zero (0). At step S24, indexes i and j may be computed from the index k by considering that the permutation PM is a two-entry table including rows of W+1 elements and columns of W+1 elements. Accordingly, the index i can be computed as being the integer part of the division of the value PM[k] by (W+1), and the index j can be computed as being the difference between the value PM[k] and the product of the index i by (W+1). Step S25 may compute the table values SBM[i,j] randomly selected in the table SBM, using the random permutation PM. Each value SBM[i,j] at indexes i and j in the table SBM may be set to the result $SBX[[j \oplus U[i]] \oplus V[i]$ of XOR operations applied to the data $SB[j \oplus U[i]]$ and V[i], the mask parameters U[i] and V[i] being also randomly selected in the tables U and V since the indexes i and j are defined using the permutation PM. At step S26, the index k may be incremented by one (1). At step S27, the index k may be compared with the maximum value KX. If the index k is greater than the value KX, step S28 may be performed; otherwise steps S25 to S27 may again be performed for a new iteration. At step S28, the masked table SBM may be completely defined and may be provided as output of steps S21 to S27. The substitution table SBX and the masked substitution tables SBM are illustrated in FIG. 10C. It can be noted that the use of the permutation PM is not mandatory, and the values of the tables SBM can be computed in a determined order.

The circuit XG4 of each of the circuits OC2 may combine the input data X1 with the mask parameter U[l] by XOR operations. The circuits XG4 together may execut the steps S11 to S17 of FIG. 3, each of the (W4+1) (=16) bytes of the input data X1 being combined with a respective mask parameter U[l] having the size of one byte, for each mask parameter of the mask set U (l=0, . . . W). Each of the circuits XG4 may provide an input data $PX10[l] = X1 \oplus U[l]$.

The circuit XG1 of each circuit OC2 may combine the data PX10[l] with the round key KT[0] by XOR operations. The circuits XG1 together execute the steps S31 to S37 of FIG. 11. Each of the 16 bytes of the input data X1 may be combined with a respective byte of the first round key KT[0].

Figure 11:
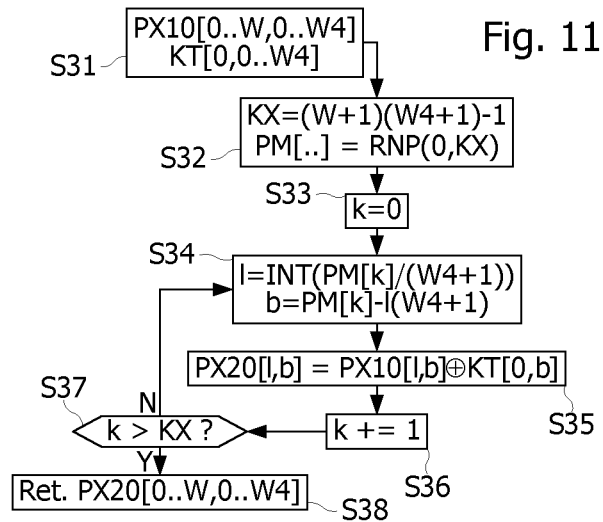
FIG. 11 is a block diagram of a conventional mix column operation in AES encryption algorithm.

FIG. 11 illustrates steps (operations, functions, processes, etc.) S31 to S38 of a procedure for generating an output set PX2<0> resulting from the application of an operation to an input set PX10 and the round key KT[0], according to an example embodiment. Steps S31 to S37 may first be successively performed. At step S31, the output set PX2<0> and the round key KT[0] including W4+1 (24=16) words are input. At step S32, a permutation PM in the form of a table may be randomly generated using the function RNP. The permutation PM including (W+1)(W4+1) values between 0 and a maximum value $KX=(W+1)(W4+1)-1$, where $W+1=2P$, P (=8) being the number of bits of each of the words $KT[0,b]$ forming the round key $KT[0]$. At step S33, an index k may be initialized to zero (0). At step S34, indexes l and b may be computed from the index k by considering that the permutation PM is a two-entry table including rows of $W4+1$ elements and columns of $W+1$ elements. Accordingly, the index l can be computed as being the integer part of the division of the value $PM[k]$ by $(W4+1)$, and the index b can be computed as being the difference between the value $PM[k]$ and the product of the index l by $(W4+1)$. Step S35 may compute output data $PX2<0>[l,b]$ of the output set $PX2<0>$ in the form of a two-entry table. Each output data $PX2<0>[l,b]$ at indexes l and b may be set to the result $PX10[l,b] \oplus KT[0,b])$ of XOR operations applied to the words $PX2<0>[l,b]$ and $KT[0,b]$. In using the permutation PM, the output data $PX2<0>[l,b]$ in the output set $PX2<0>$ may be computed in a random order and arranged in the output set $PX2<0>$ also in a random order. At step S36, the index k may be incremented by one (1). At step S37, the index k may be compared with the maximum value KX. If the index k is greater than the value KX, step S38 may be performed; otherwise steps S35 to S37 may again be performed for a new iteration. At step S38, the output set $PX<2>$ may be completely defined and provided as output of steps S31 to S37. It can be observed that each data $PX2<0>[l]$ (of size $W4+1$ bytes) in the output set $PX2<0>$ is the result of the operation $PX10[l] \oplus KT[0]$ where $PX10[l]=X1 \oplus U[l]$. Then $PX2<0>[l]=(X1 \oplus KT[0]) \oplus U[l]$. Therefore, the mask $U[l]$ applied to the input value X1 can be retained throughout the computations performed by the operation XG1 in the circuits OC2.

In some implementations, it is not necessary to compute the data in the output set $PX2<0>$ in a random order or to store them in a random order. In such cases, the use of the permutation PM is not mandatory.

The circuit SBB of each of the circuits OC2 may receive the data $PX2<r>[l]$ from the output set $PX2<0>$ or the data $PX2<r>[l]$ from an output set $PX2<r>$ resulting from a previous computation round r, and the masked substitution table SBM[l]. The circuits SBB together may execute the steps S41 to S47 of FIG. 12, each of the $W4+1$ bytes of each data $PX2<r>[l]$ of the set $PX2<r>$ (r=0, 1, . . . ) being used as an index to select an input data in one of the substitution tables SBM.

Figure 12:
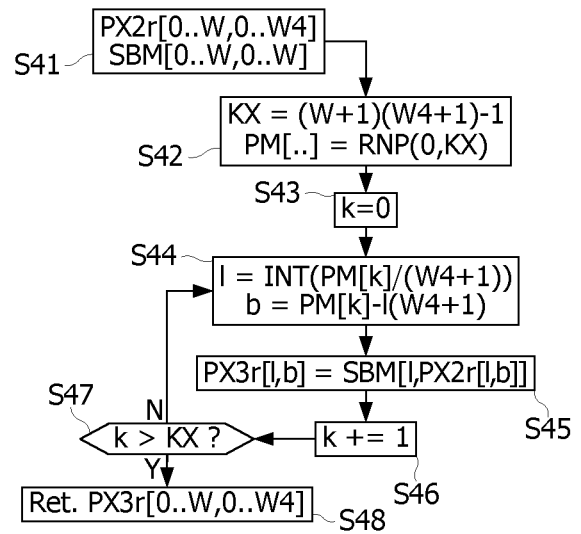
FIG. 12 is a block diagram of an AES mix column circuit of a protected AES encryption circuit, according to an example embodiment.

FIG. 12 illustrates steps (operations, functions, processes, etc.) S41 to S48 of a procedure performing a protected substitution operation, using the masked substitution tables SBM, according to an example embodiment. Steps S41 to S47 may first be successively performed. At step S41, the masked substitution table SBM and the set $PX2<r>$ may be input. The set $PX2<r>$ includes words $PX2<r>[0,0]$, . . . $PX2<r>[W,W4]$. At step S42, a permutation PM in the form of a table may be randomly generated using the function RNP. The permutation PM may include $(W+1)(W4+1)$ values between 0 and the maximum value KX equal to $(W+1)(W4+1)-1$. At step S43, an index k may be initialized to zero (0). At step S44, indexes l and b may be computed as in step S4, At step S34, indexes l and b may be computed from the index k by considering that the permutation PM is a two-entry table including rows of $W4+1$ elements and columns of $W+1$ elements. Accordingly, the index l can be computed as being the integer part of the division of the value $PM[k]$ by $(W4+1)$, and the index b can be computed as being the difference between the value $PM[k]$ and the product of the index l by $(W4+1)$. Step S45 may compute the output data $PX3<r>[l,b]$ randomly selected in the output set $PX3<r>$, using the random permutation PM. Each output byte $PX3<r>[l,b]$ at indexes l and b may be set to the value of the data $SBM[l,PX2<r>[l,b]]$ selected in the table $SBM[l]$ at an index defined by the data $PX2<r>[l,b]$ selected in the set $PX2<r>$ at indexes l and b. At step S46, the index k may be incremented by one (1). At step S47, the index k may be compared with the maximum value KX. If the index k is greater than the value KX, step S48 may be performed; otherwise steps S44 to S47 may again be performed for a new iteration. At step S48, the output set $PX3<r>$ is completely defined and provided as output of steps S41 to S47.

The set $PX3<r>$ provided by the circuits SBB in the circuits OC2 may include data $PX3<r>[l]$ equal at the first round (r=0) to $SBX[X1 \oplus KT[0]] \oplus V[l]$ (l=0, . . . W). The circuits SHR of the circuits OC2 may process the set $PX3<r>$ and may provide an output set $PX4<r>$. The position of the circuits SBB and SHR can be inversed, the row-based circular permutation calculation performed by the circuit SHR being applied to the data in the table $PX2<r>$ before performing the substitute calculation performed by the circuit SBB. At rounds r=0 to R−1, the set $PX4<r>$ may be provided to the circuits MXC of the circuits OC2.

Figure 13:
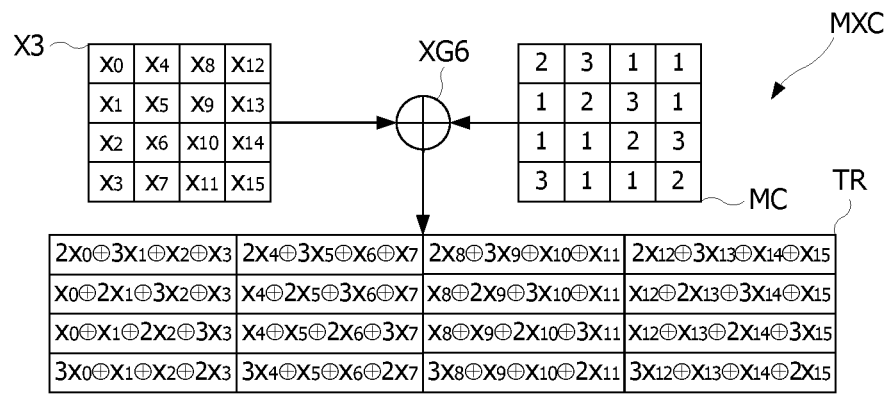
FIG. 13 is a flowchart of a method for generating a protected substitution table, according to another example embodiments.

FIG. 13 illustrates the circuit MXC in accordance to an example embodiment. The circuit MXC may combine a data X3 received from the circuit SHR with a coefficient matrix MC of 4×4 elements. As a result, the output data X3 may be organized into a matrix format of 4×4 elements x0 to x15. Each of the elements may correspond to the bytes of the data X6 which is encoded on 128 bits. The elements of the matrix X6 may be combined together by XOR operation circuit XG6 with the elements of the matrix MC to produce a resultant matrix TR of 4×4 elements where each element has the following form:

$$a \cdot x<i> \oplus b \cdot x<i+1> \oplus c \cdot x<i+2> \oplus d \cdot x<i+3>, \quad (16)$$

where a, b, c, d (=1, 2 or 3) are the elements of one line of the matrix MC and i is equal to 0, 4, 8 and 12. According to AES algorithm, the operation 2·x may be performed by using the operation $LS1(x)$ if x is lower than 128 (when the most significant bit (MSB) of x equals 0) and the operation $LS1(x) \oplus 0x1B$ if x is greater or equal to 128 (when the MSB of x equals 1), $LS1(x)$ representing a shift to the left by one bit in the byte x. The operation 3·x is performed using the operation 2·x $\oplus$ x.

Since each byte b of the input data X3 is represented by one table $PX4<r>[0 . . . W,b]$, the circuit MXC may perform 3×16 XOR operations for each byte in the set $PX4<r>[l,0 . . . W4]$. One more XOR operations may be necessary to perform the operation 3·x. However, in some implementations of AES algorithm, the operations 2·x and 3·x may be implemented by lookup tables.

Figure 14:
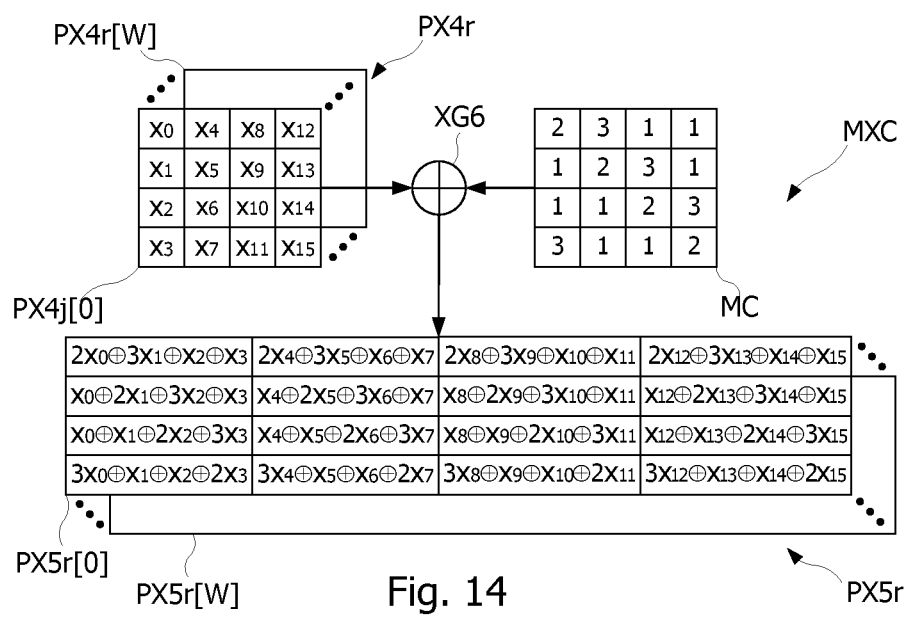
FIG. 14 is a flowchart of a substitution operation protected according to an example embodiment.

As illustrated in FIG. 14, the XOR operations for computing an element of the matrix TR as disclosed in FIG. 13 is performed within each table $PX4<r>[l,0 . . . W4]$ and these operations provides a table $PX5<r>[l,0 . . . W4]$ for each table $PX4<r>[l,0 . . . W4]$.

In addition, the order of the operations should be examined when performing the operations of the circuit MXC to keep the masks on the data, since each byte $x'<j>$ is masked by a same mask v $(=V[l]$, $x'<j>=x<j> \oplus v)$. The operations of the equation (16) are performed by applying the following property:

$$a(x \oplus v)=ax \oplus av, \text{ with } a=2 \text{ or } 3. \quad (17)$$

Thus:

$$\begin{aligned} A &= 2x\langle 0\rangle \oplus 3x\langle 1\rangle \oplus 2v \oplus 3v \oplus x'\langle 2\rangle \oplus x'\langle 3\rangle \\ &= 2x\langle 0\rangle \oplus 3x\langle 1\rangle \oplus 2v \oplus 2v \oplus v \oplus x'\langle 2\rangle \oplus x'\langle 3\rangle \\ &= 2x\langle 0\rangle \oplus 3x\langle 1\rangle \oplus v \oplus x\langle 2\rangle \oplus v \oplus x'\langle 3\rangle \\ &= 2x\langle 0\rangle \oplus 3x\langle 1\rangle \oplus x\langle 2\rangle \oplus x'\langle 3\rangle \end{aligned} \quad (18)$$

Therefore, at this step of the computations, the mask v may be removed, which can form a leakage exploitable by a side-channel analysis to determine the data x, even if the mask v reappears when the last XOR operation is performed:

$$A = (2x\langle 0\rangle \oplus 3x\langle 1\rangle \oplus x\langle 2\rangle \oplus x\langle 3\rangle) \oplus v. \quad (19)$$

In contrast, if the computation of element A is performed in the following order:

$$A = 2x'\langle 0\rangle \oplus x'\langle 2\rangle \oplus x'\langle 3\rangle \oplus 3x'\langle 1\rangle, \quad (20)$$

we obtain:

$$\begin{aligned} A &= 2x\langle 0\rangle \oplus x\langle 2\rangle \oplus x'\langle 3\rangle \oplus 3x'\langle 1\rangle \oplus 2v \oplus v \\ &= 2x\langle 0\rangle \oplus x\langle 2\rangle \oplus x\langle 3\rangle \oplus 3x'\langle 1\rangle \oplus 3v \oplus v \\ &= 2x\langle 0\rangle \oplus x\langle 2\rangle \oplus x\langle 3\rangle \oplus 3x'\langle 1\rangle \oplus 2v \oplus v \oplus v \\ &= 2x\langle 0\rangle \oplus x\langle 2\rangle \oplus x\langle 3\rangle \oplus 3x\langle 1\rangle \oplus 2v \oplus 3v \\ &= 2x\langle 0\rangle \oplus x\langle 2\rangle \oplus x\langle 3\rangle \oplus 3x\langle 1\rangle \oplus v. \end{aligned} \quad (21)$$

Therefore, when performing the XOR operations in the order of the coefficients a, b, c, d, which may be equal to (2 1 1 3), respectively, the result of each XOR operation may always be masked. The orders (1 2 1 3), (3 1 1 2) and (1 3 1 2) also maintain the masking after each XOR operation. It is noted that the mask v applied to the input data is kept in the output data of the operation performed by the circuit MXC.

Figure 15:
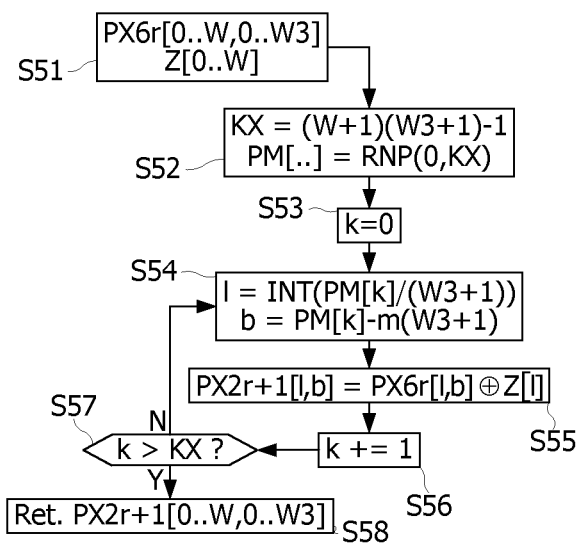
FIG. 15 is a flowchart of an XOR operation protected according to an example embodiment.

The circuits XG2 of the circuits OC2 may combine the set PX5$\langle r\rangle$ with a round key KT[r]. Hence, the circuits XG2 together may execute the steps S31 to S37 of FIG. 11, using in input the set PX5$\langle r\rangle$ and the round key KT[r], to provide an output set PX6$\langle r\rangle$. The circuit XG5 of each of the circuits OC2 may combine the data PX6$\langle r\rangle$[l] with the mask parameter Z[l]=U[l]$\oplus$V[l] by XOR operations. In some implementations, the circuits XG5 together may execute the steps S51 to S57 of FIG. 15, to combine each of the (W4+1) (=16) bytes of each data PX6$\langle r\rangle$[l] with a respective mask parameter Z[l] having the size of one byte, for each mask parameter of the mask set Z (l=0, . . . . W). Steps S51 to S57 may first be successively performed. At step S51, the mask table Z and the set PX6$\langle r\rangle$ may be input. At step S52, a permutation PM in the form of a table may be randomly generated using the function RNP, the permutation PM may include (W+1)(W4+1) values between 0 and a maximum value KX=(W+1)(W4+1)−1. At step S53, an index k may be initialized to zero (0). At step S54, indexes l and b may be computed as in step S4. Step S55 may compute the output word PX2$\langle r+1\rangle$[l,b] at indexes l and b in the output set PX2$\langle r+1\rangle$ by combining by XOR operations the input word PX6$\langle r\rangle$[l,b] at indexes l and b randomly selected in the input set PX6$\langle r\rangle$ with the mask parameter Z[l] at index l randomly selected in the mask table Z, using the random permutation PM (PX2$\langle r+1\rangle$[l,b]=PX6$\langle r\rangle$[l,b]$\oplus$ Z[l]). At step S56, the index k may be incremented by one (1). At step S57, the index k may be compared with the maximum value KX. If the index k is greater than the value KX, step S58 may be performed; otherwise steps S54 to S57 may again be performed for a new iteration. At step S58, the output set PX2$\langle r+1\rangle$ may be completely defined and provided as output of steps S51 to S57.

The output set PX2$\langle r+1\rangle$ provided by the circuits XG5 of the circuits OC2 may include words PX2$\langle r+1\rangle$[l,b] masked with the mask parameters Z[l]=U[l]$\oplus$V[l] (l=0, . . . W). Since the words PX6$\langle r\rangle$[l,b] in the output set PX6$\langle r\rangle$ are already masked with the masks parameters V[l] applied by the circuit SBB, the masks parameters V[l] may be removed by the circuits XG5. Thus, all the words PX2$\langle r+1\rangle$[l,b] in the data set PX2$\langle r+1\rangle$ may only be masked by the mask parameters U[l], and thus the data set PX2$\langle r+1\rangle$ may be ready to be further processed by the circuit SBB at a next round r+1.

At a last round R, a data set PX4$\langle R\rangle$ may be provided by the circuits SHR to the circuits XG3 of the circuits OC2. The circuits XG3 may combine each data PX4$\langle R\rangle$[l] with a last round key KT[R]. The circuits XG3 together can execute the steps S31 to S37 of FIG. 11 using the data set PX4$\langle R\rangle$ and the last round key KT[R]. Finally, the circuits XG3 may provide an output set PX7$\langle R\rangle$ including words PX7$\langle R\rangle$[l,b]=CX1[b]$\oplus$V[l], where CX1 is the expected output data (encrypted data) corresponding to the input data X1, provided by AES algorithm. More particularly, the output set PX7$\langle R\rangle$ may include a data PX7$\langle R\rangle$[n] at an index n equal to the expected output data CX1, n being the index of the input data X1 in the input set PX10. According to an embodiment, the circuit XG3 is configured to extract the data CX1 alone.

The decryption algorithm according to AES includes substantially the same operations as the encryption algorithm. Therefore, the previously described method using pairs of mask sets (U, V) can be applied to protect a program and a circuit implementing the AES decryption algorithm. More particularly, an AES decryption circuit may include circuits performing XOR operations with round keys, an inverse substitute calculation circuit, an inverse row-based circular permutation calculation circuit, and/or an inverse column-based permutation calculation circuit. The methods illustrated in FIG. 11 can be applied to each operation performed by the XOR operations with derived keys. The method illustrated in FIG. 12 can be applied to each operation performed by the inverse substitute calculation circuit. The method illustrated in FIG. 14 can be applied to the inverse column-based permutation calculation circuit.

It is noted that the protection method previously disclosed may be applied only to some operations performed in the AES algorithm, which would be vulnerable to side channel analysis. For example, the protection method can be applied only to the first and last rounds of AES algorithm, from which sensitive data could leak.

However, exemplary protection methods as disclosed herein can be applied to other encryption algorithms, such as, for example, ARIA, implemented by software and/or by hardware, and including XOR operations combining sensitive data. The ARIA algorithm processes 128-bit data byte per byte and may be performed by round. Each round may include a round key addition by a XOR operation, a substitution step using two precomputed substitution tables and its inverses, and a diffusion step. The substitution step may process per byte the input data combined with the round key, and the diffusion step may apply 16 different XOR combinations to the 16 bytes of the data provided by the substitution step. In each of these combinations, seven bytes of the data may be added by XOR operations.

Figure 16:
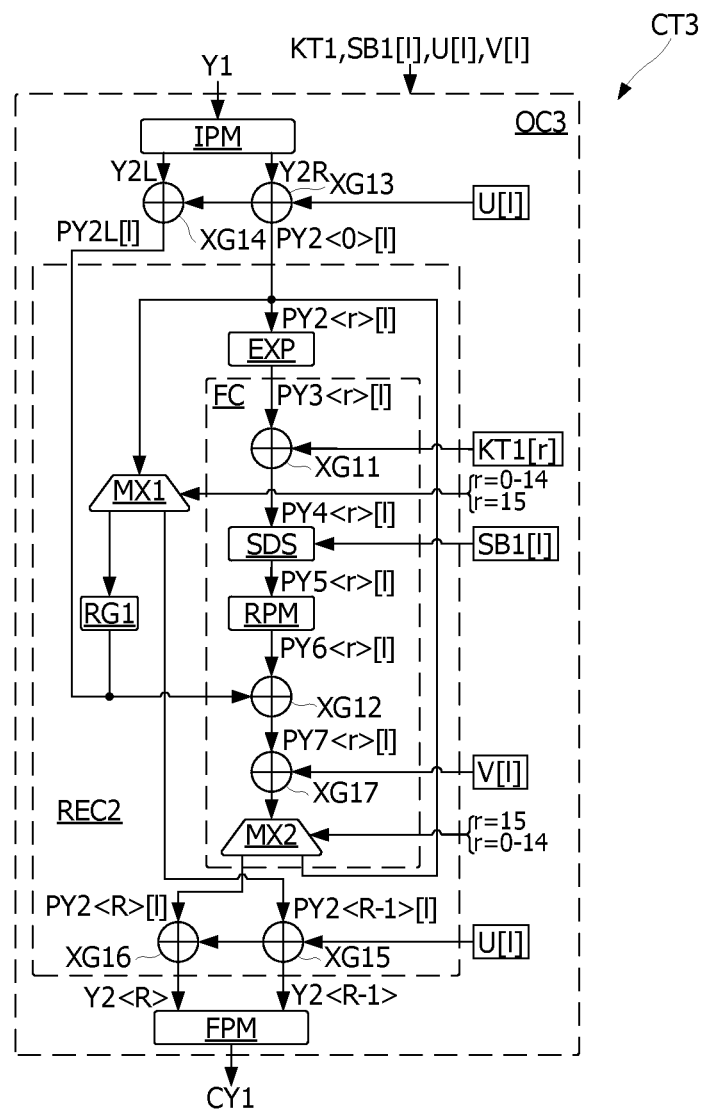
FIG. 16 is a block diagram of DES encryption algorithm including protection steps according to an example embodiment.

FIG. 16 illustrates a cryptographic calculation circuit CT3 implementing DES algorithm for encrypting a data in accordance to an example embodiment. For further details about DES algorithm can be described and referred to in document "Data Encryption Standard (DES) FIPS PUB 46-3" published on 25 Oct. 1999. In FIG. 16, the cryptographic calculation circuit CT3 may receive a data Y1 to be processed and may supply a resultant data CY1. The circuit CT3 may also receive a round key table KT1 containing all round keys derived from a secret key according to DES algorithm, and DES substitution tables. The circuit CT3 may have the architecture of the circuit CT1, and thus, includes W+1 identical circuits OC3, each receiving the input data Y1 and a respective mask parameter U[l] from a mask set U. Each circuit OC3 may include an initial permutation circuit IPM, a final permutation circuit FPM, and/or a main encryption circuit REC2 including circuits XG11, XG12 performing XOR operations, an expansion circuit EXP, a substitute calculation circuit SDS, a bit permutation circuit RPM, one register RG1, and/or multiplexers MX1, MX2. The input data Y1 which may be encoded on a 64-bit word may be applied to the initial permutation circuit IPM. The circuit IPM may perform the DES initial permutation operation. The result of the operation performed by the circuit IPM may be divided into a left and a right 32-bit word Y2L, Y2R.

The left word Y2L may be transmitted to the circuit XG2. The right word Y2R may be transmitted to the circuit EXP and the multiplexer MX1, which may have one output connected to the register RG1 and one output connected to a right input of the circuit FPM. The register RG1 may be connected to one input of the circuit XG2. The circuit EXP may perform the DES expansion operation. The circuit EXP may receive a 32-bit data and may provide a 48-bit data formed of eight 6-bit words to the circuit XG11.

The circuit XG11 may combine the 48-bit word in output of the circuit EXP with a first round key KT[0], which may also be encoded on 48 bits, by XOR operations. The result of the operation performed by the circuit XG11 may be processed by the substitute calculation circuit SDS, which may provide a 32-bit word using the eight DES substitution tables. Each 6-bit word in input of the circuit SDS may be used as an index to select a 4-bit word in a respective one of the eight DES substitution tables. Hence, the circuit SDS may provide eight 4-bit words, forming a 32-bit data which may be processed by the circuit RPM performing the DES round bit permutation operation. The 32-bit data provided by the circuit RPM may be combined with the 32-bit data in the register RG1, by the circuit XG12 applying XOR operations. The result provided by the circuit XG12 may be transmitted to the multiplexer MX2 having one output connected to the circuit EXP and the multiplexer MX1, and one output connected to a left input of the circuit FPM. The circuit FPM may perform the DES final permutation operation and may provide a 64-bit word CX1.

At a first calculation round based on DES algorithm, a right 32-bit word Y2R (R0) in output of the circuit IPM may be stored in the register RG1 and processed by the circuit EXP, and then successively by the circuit XG11, SDS and RPM, and provided to the circuit XG12. The left 32-bit word Y2L (L0) in output of the circuit IPM may be transmitted to the circuit XG12. The right word Y2R (R0) may be transferred by the multiplexer MX1 to the register RG1. The word (R1) in output of the circuit XG12 may be transmitted by the multiplexer MX2 to the circuit EXP for a new calculation round, and to the multiplexer MX1 for a next round. At a second and all subsequent calculation rounds, the 32-bit word computed by the circuit XG12 may be processed by the circuits EXP, XG1, SDS, RPM and XG12, the circuit XG12 receiving the word stored in the register RG1.

At a 16th and last round, a word (R14) in the register RG1 may be combined with an output of the circuit RPM by the circuit XG12, which may provide a word (R16) to the multiplexer MX2 and transmits as a most significant word to the left input of the final permutation circuit FPM. At the same time, the word (R15=L16) computed by the circuit XG12 may be provided by the multiplexer MX1 as a least significant word to the right input of the circuit FPM which outputs the output data CY1.

In some implementations, each of the circuits OC3 may receive a respective a mask parameter U[l] from a mask set U, a mask parameter V[l] from a mask set V, and/or masked substitution tables SB1[l]. Each of the circuits OC3 may include circuits XG13, XG14, XG15, XG16 performing XOR operations with the mask parameter U[l], and a circuit XG17 performing XOR operations with the mask parameter V[l]. The circuits XG13, XG14 may be interposed between the circuit IPM, and respectively, the circuits EXP and XG12. The circuits XG15, XG16 may be interposed between the multiplexers MX1, MX2, respectively, and the circuit FPM. The circuit XG17 may be interposed between the circuit XG12 and the multiplexer MX2. The circuits XG13 and XG14 may provide 32-bit word input sets PY2<0> (=PY2R) and PY2L from the data Y2L, Y2R provided by the circuit IPM. The circuit EXP may provide a 48-bit word output set PY3<r> from the output set PY2<r>, r being the DES round number, from 0 to R. The circuit XG1 may provide a 48-bit word output set PY4<r> from the output set PY3<r>. The circuit SDS may provide a 32-bit word output set PY5<r> from the output set PY4<r>. The circuit RPM may provide a 32-bit word output set PY6<r> from the output set PY5<r>. The circuit XG12 may provide a 32-bit word output set PY7<r> from the output set PY6<r>. Finally, the circuit XG17 may provide the 32-bit word output set PY2<r+1> from the output set PY7<r>. The circuit XG15 may remove the mask parameter U[l] from the data PY2[l]<R−1>, and the circuit XG16 may remove the mask parameter U[l] from the data PY2[l]<R>.

In some implementations, the mask set U in input of the circuit CT3 may include W+1 32-bit words, each being obtained by concatenating four bytes U1[l], U2[l], U3[l], U4[l] (U[l]=U1[l]//U2[l]//U3[l]//U4[l], for each integer number l between 0 and W=255), U1, U2, U3, U4 being four permutations of W+1 bytes, such that:

$$U2=F1(U1),$$

$$U3=F2(U1), \text{ and}$$

$$U4=F3(U1), \tag{22}$$

F1, F2, F3 being functions, such that each of the 48-bit words EXP(U[l]) provided by the circuit EXP applied to each of the 32-bit words U[l] (l=0 to W), includes eight six-bits words, each including only once bits of the 8-bit word U1[l]. In other words, the transformed set EXP(U) obtained by applying the expansion function EXP to the mask set U has the form of a table of (W+1)(W3+1) 6-bit words, each column of (W+1) 6-bit words including four (4) occurrences of each possible value (0 to 63) of a 6-bit word.

Figure 18:
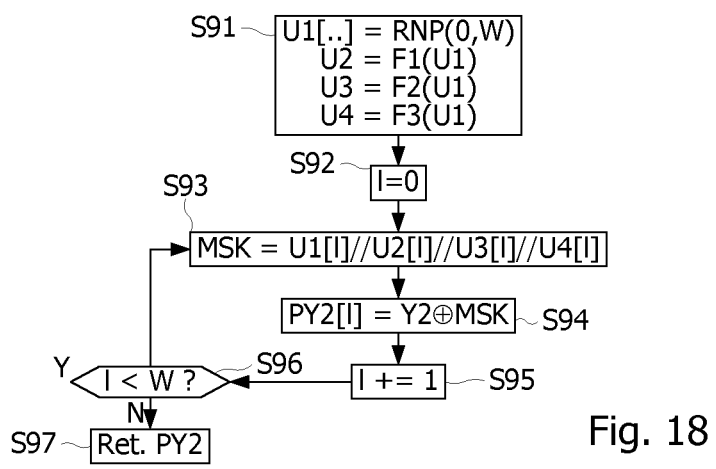
FIG. 18 is a flow-chart of protection steps transforming an input data according to another example embodiment.

The masked substitution tables SB1 may be generated by executing the procedure of FIG. 18, for example.

Figure 17:
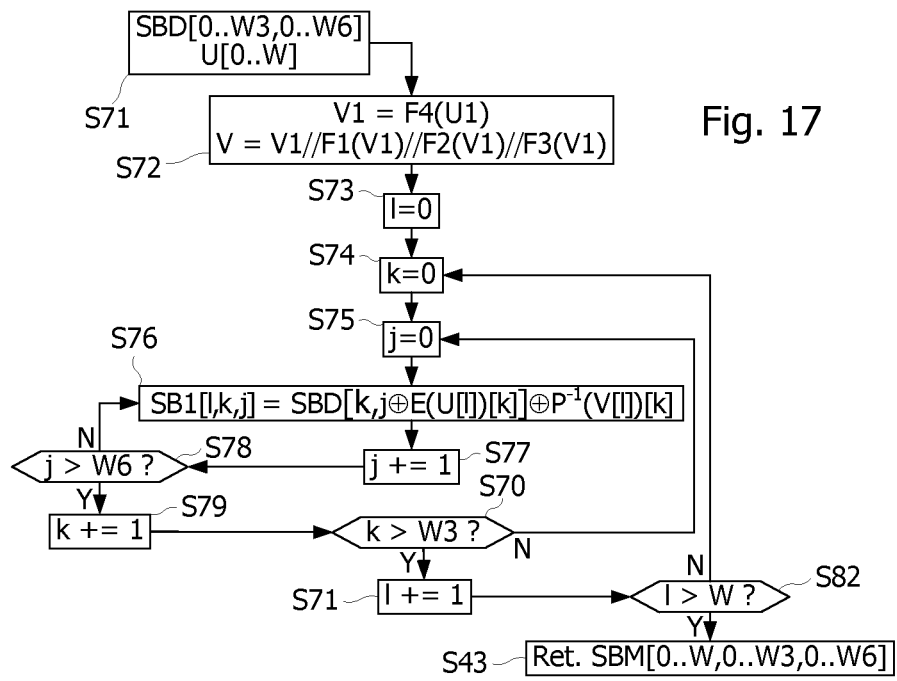
FIG. 17 is a flowchart of a method for generating a protected substitution table, according one embodiment.

FIG. 17 illustrates steps (operations, functions, processes, etc.) S71 to S83 of a procedure performing a protected substitution operation, according to an example embodiment. Steps S71 to S78 may first be successively performed. At step S71, the procedure may receive the DES substitution tables SBD and the mask set U. The substitution tables SBD may include W3+1 (=8) substitution tables SBD[0 . . . W3, 0 . . . W6], each including W6+1 (=64) 4-bit words. At step S72, a mask set V is computed. At step S73, an index l may be initialized to zero (0). At step S74, an index k may be initialized to zero (0). At step S75, an index j may be initialized to zero (0). At step S76, one element of the masked substitution table SB1 may be computed using the following equation:

$$SB1[l,k,j]=SBD[k,j\oplus E(U[l])[k]]\oplus P^{-1}(V[l])[k] \quad (23)$$

where SBD[k] represents the DES substitution table of rank k (with k=0 to W3=7), each table SBD[k] including 64 4-bit words which can be selected using 6-bit indexes, E(U[l]) represent a 48-bit word resulting from the DES expansion operation performed by the circuit EXP, applied to the mask parameter U[l], E(U[l])[k] represents a 6-bit word of index k in the 48-bit word E(U[l]), $P^{-1}$(V[l]) represents a 32-bit word resulting from an inverse $P^{-1}$ of the DES round permutation operation performed by the circuit RNP applied to the mask parameter V[l], and $P^{-1}$(V[l])[k] represents a byte of index k in the 32-bit word $P^{-1}$(V[l]). At step S77, the index j may be incremented by one (1). At step S78, the index j may be compared with a maximum value W6 which is equal to $2^6$−1 (=63). If the index j is greater than the value W6, steps S79 and S80 may be executed; otherwise steps S75 to S78 may be executed again for a new iteration. At step S79, the index k may be incremented by one (1). At step S80, the index k may be compared with a maximum value W3 ($=2^3$−1=7). If the index k is greater than the value W3, steps S81 and S82 may be executed; otherwise steps S75 to S80 may again be executed for a new iteration. At step S81, the index l may be compared with the maximum value W, which is equal to $2^6$−1 (=255). If the index l is greater than the value W, step S83 may be executed; otherwise steps S74 to S82 may again be executed for a new iteration. At step S83, the masked substitution tables SB1[0 . . . W,0 . . . W3,0 . . . W6] may be provided as a result of steps S71 to S82.

The mask set V may include W+1 32-bit mask parameters each being formed of four bytes V1[l], V2[l], V3[l], V4[l], (l=0 to W), V1, V2, V3, V4 being permutations of W+1 bytes (including a single occurrence of each possible value of one byte).

In some implementations, the permutation V1 may be generated by applying a function F4 to the permutation U1. The function F4 may be selected such that the permutation Z1 formed of the bytes U1[l]⊕F4(U1[l]) with l=0 to W, and may include W+1 bytes and a single occurrence of each possible value of one byte. The function F4 may further be selected such that the set P−1(V[l]) resulting from the application of an inverse P−1 of the DES round permutation operation performed by the circuit RNP applied to the mask parameters V[l] of the set V, includes a single occurrence of each possible value of one byte. The permutation V1 can be defined from the permutation U1, using the equations (12) or (13), considering that V0=F4(U0). Then the permutations V2, V3 and V4 are computed using the functions F1, F2, F3 used to compute the permutations U2, U3, U4. Thus:

$$V2=F1(V1),$$

$$V3=F2(V1), \text{ and}$$

$$V4=F3(V1). \quad (24)$$

The permutation U1 and the functions F1, F2, F3 may further be selected such that each of the 32-bit words $P^{-1}$(V[l]) applied to each of the 32-bit words V[l] (l=0 to W), includes eight 4-bits words, where each including only once bits of the 8-bit word V1[l]. In other words, the transformed set $P^{-1}$(V) has the form of a table of (W+1)(W3+1) of 4-bit words, where each column of (W+1) 4-bit words including sixteen (16) occurrences of each possible value (0 to 15) of a 4-bit word.

In some implementations, the circuits XG13, XG14 of all circuits OC3 may process the data Y2L, Y2R received from the circuit IPM to provide two data sets PY2L, PY2R (=PY2<0>) by executing steps S61 to S67 of FIG. 17. The steps S61 to S66 may first be executed successively. At step S61, a random permutation U1 may be generated, where the permutation U1 including all the W+1 (=256) byte values (between 0 and 255) in a random order. Permutations U2, U3 and U4 may further be generated by respectively applying functions F1, F2, F3 to the permutation U1. At step S63, the mask value MSK may be generated by concatenating the bit strings formed by the mask parameters U1[l], U2[l], U3[l] and U4[l], where Ui[l] is a byte of index l in the permutation Ui, and i=1, 2, 3 and 4. Thus, at step S64, each of the 32-bit right and left words Y2R, Y2L is combined with a 32-bit word formed as follows:

$$PY2[l]=Y2\oplus U1[l]//U2[l]//U3[l]//U4[l]. \quad (25)$$

with Y2=Y2R (or Y2L) and PY2=PY2R (resp. PY2L).

Figure 19:
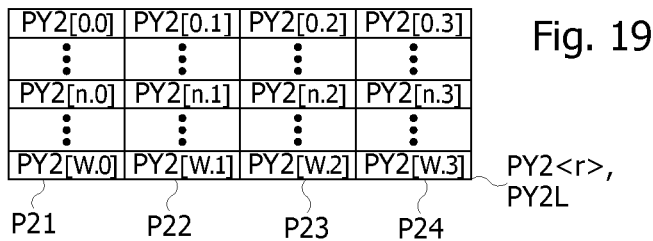
FIG. 19 is a block diagram of an intermediary data set obtained when executing DES algorithm, according to an example embodiment.

As shown in FIG. 19, each output set PY2R, PY2L may include W+1 32-bit words PY2[l], or four columns P21, P22, P23, P24 of W+1 bytes, where each column may include a single occurrence of each possible value of one byte, i.e., one occurrence of the output datum Y2R, Y2L at a row n, n being such that U1[n]=0. Since the mask word sets U2, U3 and U4 are derived from mask word set U1 by applying functions (F1, F2, F3), U2[n]=U3[n]=U4[n]=0.

Figure 20:
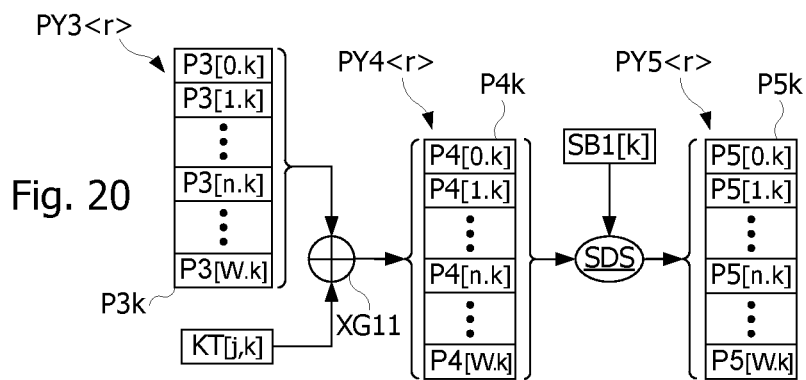
FIG. 20 is a block diagram illustrating operations of DES algorithm, according to an example embodiment.

As shown in FIG. 20, the output set PY3<r> (r=0 to R) provided by the circuits EXP of all circuits OC3 may include eight (8) columns P3k (k=0 to 7) of W+1 6-bit words P3[l.k] (l=0 to W). Due to the mask table U, each column P3k of the output set PY3<r> may include four (4) occurrences of each possible value encoded on six bits (4×64=256). Thus, the use of the mask table U as defined-above allows protection of an expansive bit permutation operation such as the one performed by the circuit EXP.

In some implementations, a circuit FC including the circuits XG11, SDS, RPM, XG12 and XG17 in all the circuits OC3 successively may process each column P3k, one after the other, as illustrated in FIG. 20. The circuits XG11 of all circuits OC3 may combine each 6-bit word P3[l.k] (l=0 to W=255) of the column P3k with a respective part KT[r,k], of 6 bits of the 48-bit round key KT[r], and may provide a column P4k of the output set PY4<0> of W+1 6-bit words P4[l.k], including four (4) occurrences of each possible value encoded on six (6) bits (4×$2^6$=256).

Hence, the substitution operation performed by the circuits SDS of all circuits OC3 may use a different masked substitution table SB1[l,k] for each word P4[l,k], for all values of l between 0 and W, and for all values of k between 0 and W3. Each 6-bit word P4[l.k] in the output column P4k may be used as an index to select a 4-bit word P5[l.k] in the DES substitution table SB1[l.k]. The circuits SDS of all circuits OC3 may provide a column P5k of the output set PY5<0> including W+1 4-bit words P5[k.l] (l=0 to W), and sixteen (16) occurrences of each possible value encoded on four bits (16×24=256).

Due to the above-defined mask tables U and V, the output set PY5<r> in output of the circuit SDS may include W3+1 (=8) columns P5k of 16 occurrences of each of the 16 possible 4-bit word values. The permutation operation performed by the circuit RPM may provide an output set PY6 including 4(W+1) bytes. Further, for the above-defined mask table V, each column of byte in the output set PY6 may also include one occurrence of each of the 256 possible byte values. It is observed that the above-definition of the mask tables U and V allows the protection of a bit permutation operation either expansive, such as the operation performed by the circuit EXP, or not expansive, such as the operation performed by the circuit RPM.

The circuit XG12 then may combine the output set PY6<r> with the output set PY2<r−1>, according to the method illustrated in FIG. 6. The circuits XG12 of the circuits OC3 may apply XOR operations to each byte PY6<r>[l,k] of the set PY6<r>, and to byte PY2<r−1>[l,k] of the set PY2<r−1> in the register RG1, for each column k of the output sets PY6<r> and PY2<r−1>. The result of the XOR operations forms for each column k a data set PY7 including (W+1) bytes computed as follows:

$$PY7<r>[l,k]=PY6<r>[l,k]\oplus PY2<r-1>[l,k], \quad (26)$$

with PX2<r−1>[l,k] representing the byte of row l and the column P2k of the set PY2L at round r=0, and of the set PY2<r−1> at other rounds r=1 to R.

In accordance to the function F4 to define the mask parameter bytes V1[l] from the mask parameter bytes U1[l], and the use of the functions F1, F2, F3 to define the other bytes U2[l], U3[l], U4[l], V2[l], V3[l], V4[l], each byte column PY7<r>[0 ... W,k] of the output table PY2<r+1> may include W+1 bytes and one occurrence of all possible values of one byte. In addition, the expected output byte may remain at the same row n of the input data X1 in the input set PX1, n being such that Ui[n]=0, with i=1, 2, 3 and 4. As a result, each 32-bit data of the output set PY7<r> provided by the circuit XG12 may be masked by the mask combination U[l]⊕V[l], where the mask parameters U[l] coming from the words of the output set PY2<r−1> and the mask parameters V[l] coming from the words of the output set PY6<r>.

Figure 21:
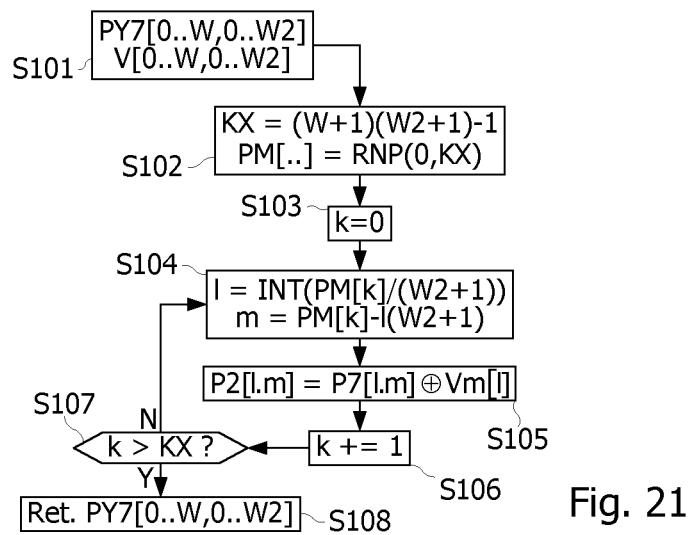
FIG. 21 is a flowchart of an XOR operation protected according to an example embodiment.

The circuits XG17 of all the circuits OC3 may remove the masks V[l] from the output set PY7<r> to provide the output set PY2<r+1> by performing XOR operations applied to bytes. An example of the procedure performed by the circuit XG17 of all the circuits OC3, is illustrated in FIG. 21. In this example, all XOR operations may be performed in a random order.

FIG. 21 illustrates steps (operations, functions, processes, etc.) S101 to S108 of a procedure performing a protected substitution operation, according to an example embodiment. Steps S101 to S107 may first be successively performed. At step S101, the mask table V and the output set PY7 are input. The output set PY7 may include bytes P7[0,0], ... P7[W,W2] (W2=22−1=3) and the mask table V, which may include W 32-bit masks parameters V[0], ... V[W], may be considered as a table of (W+1)(W2+1) bytes. At step S102, a permutation PM in the form of a table may be randomly generated using the function RNP. The permutation PM may include (W+1)(W2+1) values between 0 and a maximum value KX=(W+1)(W2+1)−1, where W+1 is the number (=256) of 32-bit words in the tables PY7 and V (W is also the greatest value in these tables). At step S103, an index k may be initialized to zero (0). At step S104, indexes l and m may be computed from the index k by considering that the permutation PM is a two-entry table including rows of W2+1 bytes and columns of W+1 bytes. Accordingly, the index l can be computed as being the integer part INT(PM [k]/(W2+1)) of the division of the value PM[k] by (W2+1), and the index m can be computed as being the difference between the value PM[k] and the product of the index l by (W2+1). Step S105 may compute the output word P2[l.m] at indexes l and m in the output set PY2 by combining by XOR operations the input word P7[l.m] at indexes l and m randomly selected in the input set PY7 with the mask parameter V[l] at index l randomly selected in the mask table V, using the random permutation PM:

$$(P2[l.m]=P7[l.m]\oplus Vm[l]). \quad (27)$$

where Vm[l] represents the byte m in the mask parameter V[l].

At step S106, the index k may be incremented by one (1). At step S107, the index k may be compared with the maximum value KX. If the index k is greater than the value KX, step S108 may be performed; otherwise steps S104 to S107 may again be performed for a new iteration. At step S108, the output set PY2 may be completely defined and provided as output of steps S101 to S107.

It is observed that such a permutation PM can be also used by the other circuits of the circuits OC3, such as XG1, XG2, RPM to process and/or store the different words in the processed data sets in a random order. The generation and use of the permutation PM can be omitted if the data in the table PY2 may be computed and/or stored in a determined order. In addition, the large and costly permutation PM can be replaced by two permutations of W+1 elements and W3+1 elements, respectively. The elements of which may be read within two nested loops, one for selecting an element of a first one of the two permutations and, one for selection an element of the other one of the two permutations.

At the end of the last round R, the mask parameters U[l] may be removed from the output sets PY2<R−1> and PY2<R>, respectively by the circuits XG15, XG16 of each circuit OC3. Accordingly, the circuits XG15, XG16 of each circuit OC3 may provide the same data Y2<R−1> and Y2<R>, respectively. The circuit FPM may receive the two data Y2<R> and Y2<R−1>, and may provide the 64-bit output data CY1. It is observed that the mask parameters U[i] may be kept throughout the operations performed by the circuits EXP and FC, thanks to the choice of the extracted column in the output set PR2. In addition, a fault injection can be detected when one of the circuits XG15, XG16 provides an output data different from the other output data Y2<R> and Y2<R−1>.

The permutations U1, U2, U3, U4 can be generated such that the 48-bit word provided by the circuit EXP applied to each of the words U1[l]//U2[l]//U3[l]//U4[l] (l=0 to W) may include eight six-bit words, where each including only once bits of the words U1[l], U2[l], U3[l], U4[l]. When this condition is met, each 6-bit word column of the set provided by the circuit EXP applied to each of the words U1[l]//U2 [l]//U3[l]//U4[l] includes four (4) occurrences of each possible value encoded on six bits. For example, if U1[l]=U2 [l]=U3[l]=U4[l]=b0//b1//b2//b3//b4//b5//b6//b7, the circuit EXP receiving the 32-bit word U1[l]//U2[l]//U3[l]//U4[l] provides the following 6-bit words:

b0//b7//b6//b3//b4//b4 which contains twice the bit b4,
b4//b4//b3//b3//b0//b0 which contains twice the bits b0, b3 and b4,
b0//b0//b6//b6//b1//b4 which contains twice the bits b0 and b6,
b1//b4//b1//b6//b1//b1 which contains four times the bit b1, b1//b1//b7//b7//b5//b7 which contains twice the bit b1 and three times the bit b7, b5//b7//b2//b2//b0//b2 which contains three times the bit b2, b0//b2//b4//b5//b5//b5 which contains three times the bit b5, b5//b5//b2//b3//b0//b7 which contains twice the bit b5.

Therefore, the condition that each output mask word OMi' includes only bits of different numbers is not fulfilled.

The above-condition provided by the circuit EXP can be expressed by an equation system, i.e., a resolution of which provides a great number of solutions (about $2^{22}$ solutions). The solutions can be expressed in the form of values of three first permutations, for example U2, U3, U4, as a function of a last permutation, U1. Some of these solutions are in the following:

U2=b0//b2//b1//b3//b4//b5//b6//b7
U3=b1//b0//b3//b2//b5//b6//b7//b4
U4=b0//b3//b1//b2//b4//b7//b5//b6
U2=b1//b3//b0//b6//b4//b5//b2//b7
U3=b5//b7//b3//b0//b4//b6//b1//b2
U4=b2//b6//b0//b3//b1//b7//b5//b4
U2=b0//b2//b1//b4//b3//b6//b5//b7
U3=b3//b0//b7//b1//b2//b4//b6//b5
U4=b0//b7//b4//b1//b5//b2//b6//b3 with U1=b0//b1//b2//b3//b4//b5//b6//b7. Each of these solutions defines the functions F1, F2, F3 used in step S61. If the circuit EXP receives the 32-bit word U1[i]//U2[i]//U3[i]//U4[i] as defined in the first solution, it provides the following 6-bit words:

b0//b7//b6//b2//b5//b4,
b5//b4//b3//b2//b1//b0,
b1//b0//b6//b7//b3//b4,
b3//b4//b0//b5//b2//b1,
b2//b1//b7//b4//b5//b6,
b5//b6//b1//b2//b0//b3,
b0//b3//b4//b7//b5//b6,
b5//b6//b1//b3//b0//b7.

It can be observed that none of the 6-bit words above contains twice (or more) the same bit of the permutation U1.

The mask set V can be generated so that the 32-bit word provided by the inverse P−1 of the operation performed by the circuit RNP applied to each of the words V1[l]//V2[l]//V3[l]//V4[l] (l=0 to W) includes four bytes, each including only once bits of the words V1[l], V2[l], V3[l], V4[l]. When this condition is met, each byte column of the set provided by the circuit RNP applied to each of the words V1[l]//V2[l]//V3[l]//V4[l] includes one occurrence of each possible byte value. When the mask parameter bytes V1-V4 are determined from the mask parameters U1-U4 using the function F4, the condition applied to the mask parameters V1-V4 resulting from the inverse bit permutation operation P−1, can be used in combination with the condition resulting from the operation EXP to determine the functions F1, F2 and F3, such that both the mask sets U and V satisfy both the conditions resulting from the permutations EXP and P−1.

It is observed that the mask set U can be defined to keep its property that each word column Ui includes the same number of occurrences of all possible values of a word after being processed by the circuit FPM. In addition, when another execution of the DES encryption algorithm is required for executing the triple DES algorithm or a chained encryption or decryption, the circuits XG15 and XG16 output data PY2<R>[n] and PY2<R−1>[n] are extracted and processed by the circuit FPM only when an encryption data is to be provided by the circuit, i.e., at the end of the third execution of the DES algorithm.

More generally, when considering the application of an operation OPR to a protected data X in the form of an input set PX, which can be obtained using the procedure of FIG. 3, and as illustrated in FIG. 4, the data X having the size of one or several words. Accordingly, the data X is represented by an input set PX including data PX[0], PX[2], ... PX[W], where each of these data having the same size as the input data X. The required input data X is at index n in the input set PX: X=PX[n], n being an integer number between 0 and W. The result of the operation is an output set PR including W+1 output data PR[0], PR[1], ... PR[W], where each data PR[l] equals OPR(PX[l]). The expected output data OPR(X) is equal to the output data PR[n] located at the same index n in the output set PR. Each data in the output set PR can be expressed as follows:

$$PR[l]=OPR(PX[l])=OPR(X \oplus IM[l])=OPR(X) \oplus OM[l], \quad (28)$$

for each index l between 0 and W, in which IM is an input mask set, OM is an output mask set of several words such that OM[l]=OPR(IM[l]) for each index l between 0 and W, each mask set IM, OM including W+1 mask parameters IM[l], OM[l], As a result, a method protection as described-above herein is efficient when each word column of the output set PR includes the same number of occurrences of all possible values of one word, in relation to the size of one word thereof. Therefore, each of the mask sets IM and OM should include mask parameters, where each including at least one word arranged in a word column in the mask set and including one word from each mask parameter of the mask set, the words in one word column of the mask sets IM and OM having the same size and including the same number of occurrences of all possible values of the words in relation to the word size. It further turns out that if the input mask set has this property, the bit permutation operations, expansive or not, do not generally transmit this property to the output mask set.

In some implementations, this property can be transmitted to the output mask set by choosing particular input mask parameters IM[l]. Such input mask parameters can be determined by the following method.

The output mask set OM is defined such that:

$$OM[l]=OPR(IM[l]), \quad (29)$$

for each index l between 0 and W. Each mask parameter IM[l] is formed of m words IMi[l] of k bits (i=1 to m):

$$IM[l]=IM1[l]//IM2[l]// \ldots //IMm[l]$$

with IMi=ib[i,x1]//ib[i,x2]// ... //ib[i,xk], ib[i,xj] representing a bit number xj of the word IMi, and xj≠xj' for each possible distinct values of j and j', and each index value i between 1 and m, IMi generically representing any value IMi[l]. Each mask parameter OM[l] is formed of m' words OMj of k' bits (i=1 to m'):

$$OM[l]=OM1[l]//OM2[l]// \ldots //OMm'[l]$$

with OMi=ob[i,x1]//ob[i,x2]// ... //ob[i,xk'], ob[i,xj] representing a bit number xj of the word OMi, and xj≠xj' for each possible distinct values of j and j', and each index value i between 1 and m', OMi generically representing any value OMi[l].

The equation (29) can be translated into a set of equations between the bits of the mask parameters words IMi and OMi' using the definition of the bit permutation operation. Solutions in the form of equalities between each of the bits of the words OMi' and one the bits of the words IMi, verifying the above rules between the bits of the words IMi, OMi', can be determined by testing hypotheses. This method can be used to define the above described mask sets U and V or the parts U1 and V1 of these mask sets.

Figure 22:
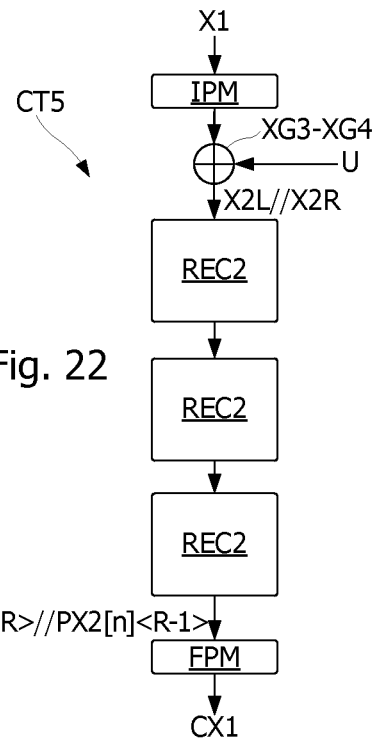
FIG. 22 is a blocks diagram illustrating a circuit implementing DES encryption algorithm, according to an example embodiment.

FIG. 22 illustrates a circuit CT5 implementing Triple DES algorithm, according to an example embodiment. The circuit CT5 may include, in series, the circuit IPM performing the DES initial permutation, several main encryption circuits REC2, a circuit FPM performing the DES final permutation, and/or the circuits XG3 and XG4 inserted between the circuit IPM and a first of the circuits REC2. The circuit IPM may receive the input data X1. The circuits XG3, XG4 may introduce the mask set U in the processing by generating the input data sets X2L, X2R. The last circuit REC2 may provide a final output data PX2[1]<R>//PX2[1]<R−1> to the circuit FP, which may provide the output encrypted data CX1. Between two circuits REC2, one of the two circuits REC2 may provide an intermediary output set PX2<R>//PX2<R−1> of 64-bit data PX2[1]<R>//PX2[1]<R−1>, which may be processed first by the expansion circuit EXP of the next circuit REC2, without having to remove the masks of the intermediary output set or extract the output data. Accordingly, the whole process is protected from the circuits XG3, XG4 to the circuit FPM.

Figure 23:
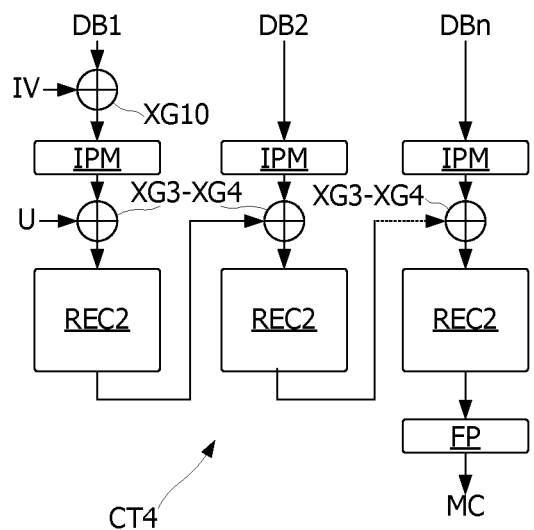
FIG. 23 is a blocks diagram illustrating a circuit implementing DES encryption algorithm, according to another example embodiment.

FIG. 23 illustrates a circuit CT4 implementing a block cipher-based message authentication code algorithm such as CMAC (Cipher-based Message Authentication Code) based on DES algorithm, in accordance to another example embodiment. The circuit CT4 may include several stages each including the circuit IPM implementing the DES initial permutation, the circuits XG4, XG5, and/or the main encryption circuit REC2 illustrated in FIG. 17.

A first stage may include a circuit XG10 performing XOR operations combining a 64-bit initial value IV with a first input data bloc DB1 of 64 bits. A final stage may include the circuit FPM receiving the data provided by the circuit REC of the final stage, and providing an output data MC. Both the circuits XG3, XG4 of the first stage may receive the mask set U. The output data provided by the circuit REC of the first stage may be provided to an input of the circuits XG3, XG4 of a next stage, where the circuit XG3 may receive the right part of the output data and the circuit XG4 receiving the left part of the output data. The circuit IPM of the next stage may receive another data block DB2, . . . DBn. The final stage includes circuit FPM receiving a 64-bit output data from the circuit REC2 of the final stage, and providing an output data MC.

Figure 24:
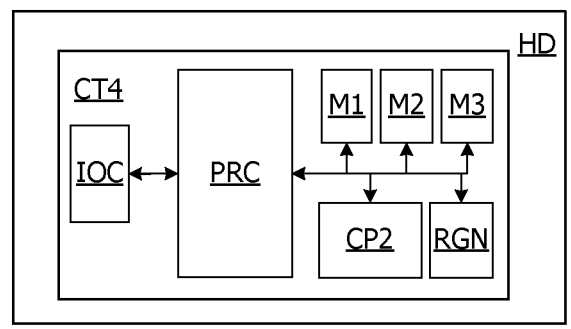
FIG. 24 is a block diagram illustrating a secure circuit, according to another example embodiment.

FIG. 24 illustrates an integrated circuit CT6 arranged on a portable medium HD, such as, for example, a plastic card, and implementing one of the protection methods previously described, according to an example embodiment. The integrated circuit CT6 may include the same units as the integrated circuit CT described above in connection with FIG. 1, and may differ from the latter in that the co-processor CP1 is replaced with a co-processor CP2 implementing one and/or the other protection methods described above, for example in the form of the circuit CT1, CT2, CT3, CT4 or CT5. In some implementations, the co-processor CP2 may be configured to provide output tables of resulting data, rather than a single data of a cryptographic operation. Each output table may include the expected result of the cryptographic operation, and the output table may be such that all data in the output table have a same number of occurrences. The processor PRC can be configured to have access to the mask table V. Hence, the processor PRC can deduce the output data from the output set by combining any one of the data in the output set by one mask parameter in the mask table V or U, where the selected data having a same rank in the output set as the mask parameter selected in the mask table V or U.

The co-processor CP2 may also be configured to execute a part of the cryptographic operation. In this case, the processor PRC may be configured to produce output tables of resulting data including the result of the cryptographic operation, where each output table being such that all data in it have the a same number of occurrences.

It is noted that the examples illustrated in FIGS. 4 to 6, can be applied to other operations than XOR, provided that these operations are performed bitwise and are reversible or bijective.

The methods disclosed herein may also be implemented by software programs executable by a computer system. Further, implementations may include distributed processing and parallel processing, especially for processing in parallel several or all data in the input data sets and/or for providing in parallel several or all data in the output data sets.

The illustrations described herein are intended to provide a general understanding of the structure of various embodiments. These illustrations are not intended to serve as a complete description of all of the elements and features of apparatus, processors and systems that utilizes the structures or methods described therein. Many other embodiments or combinations thereof may be apparent to those of ordinary skills in the art upon reviewing the disclosure by combining the disclosed embodiments. Other embodiments may be utilized and derived from the disclosure, such that structural and logical substitutions and changes may be made without departing from the scope of the disclosure.

Further, the disclosure and the illustrations are to be considered as illustrative rather than restrictive, and the appended claims are intended to cover all such modifications, enhancements and other embodiments, which fall within the true spirit and scope of the description. Thus, the scope of the following claims is to be determined by the broadest permissible interpretation of the claims and their equivalents, and shall not be restricted or limited by the foregoing description.

What is claimed is:

1. A method for securely executing, by a circuit, an operation combining a first input data with a second input data, the method comprising:

generating, by the circuit, a first input set including the first input data, each data in the first input set being obtained by applying Exclusive OR (XOR) operations to the first input data and to one of first mask parameters in a first mask set, generating, by the circuit, a second mask set including second mask parameters, each first mask parameter in the first mask set forming a respective mask pair with a corresponding second mask parameter in the second mask set, the mask pairs being such that combinations by XOR operations of the first mask parameter with the second mask parameter in each mask pair produce a third mask set including third mask parameters, the mask parameters in each of the first, second and third mask sets being such that each mask parameter in the mask set includes at least one word, the words in the first mask set having a same size and forming a word subset including a single word from each mask parameter of the mask set and a same number of occurrences of all possible values of the words;

generating, by the circuit, a second input set including the second input data, each data in the second input set being obtained by applying XOR operations to the second input data and to one of second mask parameters in a second mask set, each data in the first input set being associated with a respective data in the second input set in a respective input pair, such that the mask parameters from which each data in each input pair is computed are associated by one of the mask pairs;

computing, by the circuit, output data of an output set by applying the operation to each of the input pairs; and providing the output set as a result of the operation.

2. The method of claim 1, wherein the operation is an Exclusive OR operation.

3. The method of claim 1, wherein the second input set is equal to the first mask set.

4. The method of claim 1, wherein the first mask set and the second mask set are generated from a first permutation and a second permutation, each of the first permutation and the second permutation including words and a same number of occurrences of all possible values of the words, such that a combination by the XOR operations of each word in the first permutation with a respective word of the second permutation provide a resultant permutation including words and a same number of occurrences of all possible values of the words in the resultant permutation, the first mask set and the second mask set being generated using one equation of a set of equations including:

$(U1[l],V1[l])=(PM(u1[l]\oplus UR),PM(v1[l]\oplus VR))$, and $(U1[l],V1[l])=(PM(u1[l])\oplus UR,PM(v1[l])\oplus VR)$, for each index l, where UR and VR are random words of a size of any of the first mask parameters U1[l] and the second mask parameters V1[l], u1 and v1 are previously computed sets obtained by one of the set of equations, or equal to the first permutation and the second permutation, respectively, and PM is a randomly selected permutation applied to the previously computed sets u1 and v1.

5. The method of claim 1, wherein each of the second input data in the second input set is selected in a respective masked substitution table by a substitution operation, the masked substitution tables being generated from an input substitution table and including one masked substitution table for each first mask parameter in the first mask set and the corresponding second mask parameter in the second mask set.

6. The method of claim 5, wherein the masked substitution tables are generated by:

generating the first mask set;

generating the second mask set including a number of second mask parameters equal to a number of values in the input substitution table;

selecting once, each mask parameter in the first mask set and the second mask set, respectively, to form pairs of masks, each pair of masks including one of the first mask parameters and one of the second mask parameters; and generating for each of the first mask parameters in the first mask set one of the masked substitution table, the generation of each of the masked substitution tables including:

selecting each data in the input substitution table, and for each selected data: computing a masked data by applying the XOR operations to the selected data and to a second mask parameter corresponding to the first mask parameter or to a transformed value thereof;

computing a masked index by applying the XOR operations to an original index and to the first mask parameter or a transformed value thereof; and storing the masked data in the masked substitution table, the selected data being selected at the original index and the masked data being stored at the masked index, or the selected data being selected at the masked index and the masked data being stored at the original index.

7. The method of claim 1, wherein the computing of the output data in the output set is performed in a random order.

8. The method of claim 1, wherein each output data in the output set includes at least one word, the at least one word in the output set having a same size and forming an output word subset including a single word from each output data in the output set and a same number of occurrences of all possible values of the at least one word, the method further comprising:

detecting, in the output word subset, a word having a number of occurrences different from a number of occurrences of other words in the output word subset, an error being detected when two words with different numbers of occurrences are found in the output word subset; and combining, by the XOR operations, each data in the output set with a respective mask parameter of a resultant mask set such that the output set includes data resulting from applying the XOR operations to an output data of the operation applied to the first input data and the second input data and to each mask parameter of the resultant mask set, and an error being detected when the XOR operations applied to two data in the output set provide different data.

9. The method of claim 1, wherein the first input data is generated by operations including a bit permutation operation by which bits of a third input data are mixed, the method further comprising:

applying the bit permutation operation to all data in a third input set in which each data in the third input set is combined by the XOR operations to one the first mask parameters in the first mask set, an output of the bit permutation operation including an output set having all data resulting from an application of the bit permutation operation to one of the data in the third input set, the first mask set being generated so that each data in the output set of the bit permutation operation includes at least two words, the at least two words in the output set having a same size and forming an output word subset including a single word from each data in the output set and a same number of occurrences of all possible values of the at least two words in the output word subset.

10. The method of claim 1, wherein the operation is included in an operation for encrypting or decrypting an input data according to a cryptographic algorithm.

11. The method of claim 10, wherein the cryptographic algorithm conforms with an Advanced Encryption Standard (AES) algorithm, the method further comprising:

generating a third input set by applying the XOR operations to each word of the input data, to each of the first mask parameters of the first mask set, and to a word of a secret key corresponding the word of the input data;

performing several intermediate rounds, each intermediate round including:

performing a substitution operation using masked substitution tables providing a substitution output set in which each word is masked by a respective mask parameter of the second mask set, computing a masked round output set by applying the XOR operations to each word of a round set masked by a respective mask parameter of the second mask set, to a respective mask parameter of the first mask set and to a respective mask parameter of the second mask set, and using the masked round output set as an input set for a next round; and providing an output set in which each word is masked by a respective mask parameter of the first mask set.

12. The method of claim 10, wherein the cryptographic algorithm conforms with an Advanced Encryption Standard (DES) algorithm, the method comprising:

generating a third input set by applying the XOR operations to each word of a result data provided by an initial bit permutation operation, and to each first mask parameter of the first mask set;

performing several intermediate rounds, each intermediate round including:

performing an expansive bit permutation applied at a first round to the third input set and at subsequent rounds to a round output set, the first mask set being generated so that each data in a bit permutation output set of the bit permutation operation includes at least two words, the at least two words in the output set having a same size and forming an output word subset including a single word from each data in the output set and a same number of occurrences of all possible values of the at least two words in the output word subset;

performing a substitution operation using masked substitution tables generating a substitution output set in which each of the at least two words is masked by a respective mask parameter of the second mask set, computing a masked round output set by applying the XOR operations to each of the at two least words of a round set masked by respective mask parameters of the first and second mask sets, and to a respective mask parameter of the second mask set; and providing an output set in which each of the at least two words is masked by a respective mask parameter of the first mask set.

13. A circuit, comprising: a
hardware processor configured to:

securely execute an operation in which a first input data is combined with a second input data;

generate a first input set including the first input data, each data in the first input set being obtained by applying Exclusive OR (XOR) operations to the first input data and to one of first mask parameters in a first mask set;

generate a second mask set including second mask parameters, each first mask parameter in the first mask set forming a respective mask pair with a corresponding second mask parameter in the second mask set, the mask pairs being such that combinations by XOR operations of the first mask parameter with the second mask parameter in each mask pair produce a third mask set including third mask parameters, the mask parameters in each of the first, second and third mask sets being such that each mask parameter in the mask set includes at least one word, the words in the mask set having a same size and forming a word subset including a single word from each mask parameter of the mask set and a same number of occurrences of all possible values of the words;

generate a second input set including the second input data, each data in the second input set being obtained by applying XOR operations to the second input data and to one of second mask parameters in a second mask set, each data in the first input set being associated with a respective data in the second input set in a respective input pair, such that the mask parameters from which each data in each input pair is computed are associated by one of the mask pairs;

compute output data of an output set by applying the operation to each of the input pairs; and providing the output set as a result of the operation.

14. The circuit of claim 13, wherein the operation is an XOR operation.

15. The circuit of claim 13, wherein the second input set is equal to the first mask set.

16. The circuit of claim 13, wherein the first mask set and the second mask set are generated from a first pair of a first permutation and a second permutation, each of the first permutation and the second permutation including words and a same number of occurrences of all possible values the words, such that a combination by the XOR operations of each word in the first permutation with a respective word of the second permutation provide a resultant permutation including words, and the same number of occurrences of all possible values of the words in the resultant permutation, the first mask set and the second mask set being generated using one equation of a set of equations including:

$$(U1[l],V1[l])=(PM(u1[l]\oplus UR),PM(v1[l]\oplus VR)), \text{ and}$$

$$(U1[l],V1[l])=(PM(u1[l])\oplus UR,PM(v1[l])\oplus VR),$$

for each index l, where UR and VR are random words of a size of any of the first mask parameters U1[l] and the second mask parameters V1[l], u1 and v1 are previously computed sets obtained by one of the set of equations, or equal to the first mask set and the second mask set of the first pair of the first permutation and the second permutation, respectively, and PM is a randomly selected permutation applied to the previously computed sets u1 and v1.

17. The circuit of claim 13, wherein each of the second input data in the second input set is selected in a respective masked substitution table by a substitution operation, the masked substitution tables being generated from an input substitution table and including one masked substitution table for each first mask parameter in the first mask set and the corresponding second mask parameter in the second mask set.

18. The circuit of claim 17, wherein circuit is configured to generate the masked substitution tables by:

generating the first mask set;

generating the second mask set including a number of second mask parameters equal to a number of values in the input substitution table;

selecting once, each mask parameter in the first mask set and in the second mask set, respectively, to form pairs of masks, each pair of masks including one of the first mask parameters and one of the second mask parameters; and generating for each of the first mask parameters in the first mask set one of the masked substitution table, the generation of each of the masked substitution tables including:

selecting each data in the input substitution table, and for each selected data:
  computing a masked data by applying the XOR operations to the selected data and to a second mask parameter corresponding to the first mask parameter or to a transformed value thereof;
  computing a masked index by applying the XOR operations to an original index and to the first mask parameter or a transformed value thereof; and
  storing the masked data in the masked substitution table, the selected data being selected at the original index and the masked data being stored at the masked index, or the selected data being selected at the masked index and the masked data being stored at the original index.

19. The circuit of claim 13, wherein the computing of the output data in the output set is performed in a random order.

20. The circuit of claim 13, wherein each output data in the output set includes at least one word, the at least one word in the output set having a same size and forming an output word subset including a single word from each output data in the output set and a same number of occurrences of all possible values of the at least one word,
  the circuit being configured to:
    detect, in the output word subset, a word having a number of occurrences different from a number of occurrences of other words in the output word subset, an error being detected when two words with different numbers of occurrences are found in the output word subset; and combine, by the XOR operations, each data in the output set with a respective mask parameter of a resultant mask set such that the output set includes data resulting from applying the XOR operations to an output data of the operation applied to the first input data and the second input data and to each mask parameter of the resultant mask set, and an error being detected when the XOR operations applied to two data in the output set provide different data.

21. The circuit of claim 13, wherein the first input data is generated by operations including a bit permutation operation by which bits of a third input data are mixed,
  the circuit configured to:
    apply the bit permutation operation to all data in a third input set in which each data in the third input set is combined by the XOR operations to one the first mask parameters in the first mask set, an output of the bit permutation operation including an output set having all data resulting from an application of the bit permutation operation to one of the data in the third input set, the first mask set being generated so that each data in the output set of the bit permutation operation includes at least two words, the at least two words in the output set having a same size and forming an output word subset including a single word from each data in the output set and a same number of occurrences of all possible values of the at least two words in the output word subset.

22. The circuit of claim 13, further comprising an operation of encrypting or decrypting an input data according to a cryptographic algorithm including an operation of combining the first input data and the second input data.

23. The circuit of claim 22, wherein the cryptographic algorithm conforms with an Advanced Encryption Standard (AES) algorithm,
  the circuit further configured to:
    generate a third input set by applying the XOR operations to each word of the input data, to each of the first mask parameters of the first mask set, and to a word of a secret key corresponding the word of the input data;
    perform several intermediate rounds, each intermediate round including:
      performing a substitution operation using masked substitution tables providing a substitution output set in which each word is masked by a respective mask parameter of the second mask set,
      computing a masked round output set by applying the XOR operations to each word of a round set masked by a respective mask parameter of the second mask set, to a respective mask parameter of the first mask set and to a respective mask parameter of the second mask set, and
      using the masked round output set as an input set for a next round; and provide
    an output set in which each word is masked by a respective mask parameter of the first mask set.

24. The circuit of claim 22, wherein the cryptographic algorithm conforms with an Advanced Encryption Standard (DES) algorithm,
  the circuit being configured to:
    generate a third input set by applying the XOR operations to each word of a result data provided by an initial bit permutation operation, and to each first mask parameter of the first mask set;
    perform several intermediate rounds, each intermediate round including:
      performing an expansive bit permutation applied at a first round to the third input set and at subsequent rounds to a round output set, the first mask set being generated so that each data in a bit permutation output set of the bit permutation operation includes at least two words, the at least two words in the output set having a same size and forming an output word subset including a single word from each data in the output set and a same number of occurrences of all possible values of the at least two words in the output word subset;
      performing a substitution operation using masked substitution tables generating a substitution output set in which each of the at least two words is masked by a respective mask parameter of the second mask set,
      computing a masked round output set by applying the XOR operations to each of the at the first and second mask sets, and to a respective mask parameter of the second mask set; and
    provide an output set in which each of the at least two words is masked by a respective mask parameter of the first mask set.

25. The circuit of claim 13, further comprising a co-processor.

26. A device comprising a circuit according to claim 13, arranged on a medium.

27. A computer program product loaded into a computer memory and comprising code portions which when executed by a computer configure the computer to carry out a method for securely executing an operation combining a first input data with a second input data, the method comprising:
  generating a first input set including the first input data, each data in the first input set being obtained by applying Exclusive OR (XOR) operations to the first input data and to one of first mask parameters in a first mask set, generating a second mask set including second mask parameters, each first mask parameter in the first mask set forming a respective mask pair with a corresponding second mask parameter in the second mask set, the mask pairs being such that combinations by XOR operations of the first mask parameter with the second mask parameter in each mask pair produce a third mask set including third mask parameters, the mask parameters in each of the first, second and third mask sets being such that each mask parameter in the mask set includes at least one word, the words in the mask set having a same size and forming a word subset including a single word from each mask parameter of the mask set and a same number of occurrences of all possible values of the words;

generating a second input set including the second input data, each data in the second input set being obtained by applying XOR operations to the second input data and to one of second mask parameters in a second mask set, each data in the first input set being associated with a respective data in the second input set in a respective input pair, such that the mask parameters from which each data in each input pair is computed are associated by one of the mask pairs;

computing output data of an output set by applying the operation to each of the input pairs; and providing the output set as a result of the operation.

\* \* \* \* \*